(12) United States Patent
Kazemi Nojadeh et al.

(10) Patent No.: US 11,898,433 B2
(45) Date of Patent: Feb. 13, 2024

(54) GUIDING DRILLING OPERATIONS USING A SUBSURFACE MODEL BASED ON FULL WAVEFORM INVERSION OF SEISMIC-WHILE-DRILLING DATA

(71) Applicant: UTI LIMITED PARTNERSHIP, Calgary (CA)

(72) Inventors: Nasser Kazemi Nojadeh, Calgary (CA); Roman Jgorevich Shor, Calgary (CA); Kristopher Albert Holm Innanen, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 423 days.

(21) Appl. No.: 17/334,994

(22) Filed: May 31, 2021

(65) Prior Publication Data

US 2021/0372258 A1 Dec. 2, 2021

Related U.S. Application Data

(60) Provisional application No. 63/032,918, filed on Jun. 1, 2020.

(51) Int. Cl.
*E21B 44/00* (2006.01)
*E21B 49/00* (2006.01)
(Continued)

(52) U.S. Cl.
CPC .............. *E21B 44/005* (2013.01); *E21B 7/04* (2013.01); *E21B 44/00* (2013.01); *E21B 47/12* (2013.01);
(Continued)

(58) Field of Classification Search
CPC .......... E21B 44/005; E21B 7/04; E21B 44/00; E21B 47/12; E21B 49/003;
(Continued)

(56) References Cited

U.S. PATENT DOCUMENTS

| 2011/0131020 A1* | 6/2011 | Meng ..................... G01V 1/303 703/2 |
| 2016/0238722 A1* | 8/2016 | Vdovina ................ G01V 1/282 |
| 2018/0045559 A1* | 2/2018 | Hawthorn ................ G01V 1/16 |

OTHER PUBLICATIONS

Meglio, F.D., Aarsnes U.J.F.. "A distributed parameter systems view of control problems in drilling". IFAC—PapersOnLine. vol. 48, No. 6. 2015. 7 Pages.
(Continued)

*Primary Examiner* — Kidest Bahta
(74) *Attorney, Agent, or Firm* — Brion Raffoul

(57) ABSTRACT

System and method for guiding a drill using a subsurface model generated by successive full waveform inversions (FWI) on surface data and seismic-while-drilling (SWD) data. A server receives surface data from at least one surface sensor that records elastic energy radiated from surface seismic source and SWD data from at least one surface or at least one subsurface crosswell sensor (i.e., deployed in a nearby well). The server also receives top-drive measurements. A drillbit source signature estimation is performed, on the SWD data, by the server by blind deconvolution or by using drill string modeling and top-drive measurements. The server then performs FWI on the surface data by using the background subsurface velocity obtained by kinematic analysis of surface seismic data, to obtain an updated approximation of the subsurface velocity. The new approximation along with the drillbit source signature is then used when performing FWI on the SWD data.

20 Claims, 12 Drawing Sheets

(51) Int. Cl.
*G01V 1/48* (2006.01)
*E21B 47/12* (2012.01)
*E21B 7/04* (2006.01)
*G01V 99/00* (2009.01)
*G01V 1/28* (2006.01)

(52) U.S. Cl.
CPC ............ *E21B 49/003* (2013.01); *G01V 1/282* (2013.01); *G01V 1/48* (2013.01); *G01V 99/005* (2013.01); *E21B 2200/20* (2020.05); *G01V 2210/66* (2013.01)

(58) Field of Classification Search
CPC ...... E21B 2200/20; G01V 1/282; G01V 1/46; G01V 1/48; G01V 99/005; G01V 2210/66; G01V 2200/16; G01V 2210/121; G01V 2210/1216; G01V 2210/1295; G01V 2210/1299; G01V 2210/1425; G01V 2210/1429; G01V 2210/614; G01V 2210/6222; G01V 1/303; G01V 1/50; G01V 1/42
See application file for complete search history.

(56) References Cited

OTHER PUBLICATIONS

Auriol, J., Kazemi, N., Shor, R., Innanen, K., Gates, I.. "A Sensing and Computational Framework for Estimating the Seismic Velocities of Rocks Interacting With the Drill Bit". IEEE Transactions on Geoscience and Remote Sensing. vol. 58, No. 5. May 2020. 12 Pages.

Richard, T., Germay, C., Detournay, E.. "A simplified model to explore the root cause of stick-slip vibrations in drilling systems with drag bits". Journal of Sound and Vibration. vol. 305, No. 3. 2007. 25 Pages.

Kazemi, N., Nejadi, S., Auriol, J., Curkan, J., Shor, R., Innanen, K., Hubbard, S., Gates, I.. "Advanced sensing and imaging for efficient energy exploration in complex reservoirs". Energy Reports. vol. 6. 2020. 15 Pages.

Virieux, J., Operto, S.. "An overview of full-waveform inversion in exploration geophysics". Geophysics. vol. 74, No. 6. Dec. 3, 2009. 26 pages.

Cayeux, E. "On the Importance of Boundary Conditions for Real-Time Transient Drill-String Mechanical Estimations" Paper presented at the IADC/SPE Drilling Conference and Exhibition, Fort Worth, Texas, USA. Mar. 2018. 31 Pages.

Nejadi, S., Kazemi, N., Curkan, J., Auriol, J., Durkin, P., Hubbard, S., Innanen, K., Shor, R., Gates, I. "Look Ahead of the Bit While Drilling: Potential Impacts and Challenges of Acoustic Seismic While Drilling in the McMurray Formation". SPE Journal. Oct. 2020. 10 Pages.

Germay, C., Vand De Wouw, N., Nijmeijer, H., Sepulchre. R. "Nonlinear Drillstring Dynamics Analysis". SIAM Journal on Aplied Dynamical Systems. vol. 8, No. 2. Apr. 10, 2009. 27 Pages.

Gray, D., Day S., Schapper, S. "Rock Physics Driven Seismic Data Processing for the Athabasca Oil Sands, Northeastern Alberta". CSEG Recorder. vol. 40. No. 3. Mar. 2015. 9 Pages.

Auriol, J., Kazemi, N., Niculescu, S. "Sensing and computational frameworks for improving drill-string dynamics estimation". Mechanical Systems and Signal Processing Journal. vol. 160. 2021. 25 Pages.

Kazemi, N., Sacchi, M. "Sparse multichannel blind deconvolution". Geophysics. vol. 79, No. 5. Sep. 2014. 10 Pages.

\* cited by examiner

GUIDING DRILLING OPERATIONS USING A SUBSURFACE MODEL BASED ON FULL WAVEFORM INVERSION OF SEISMIC-WHILE-DRILLING DATA

TECHNICAL FIELD

The present invention relates to subsurface drilling. More specifically, the present invention relates to guiding a drill using a subsurface model.

BACKGROUND

Subsurface drilling operations are used for a variety of purposes. These include extraction of oil, water, and other below-ground substances, exploration, scientific research, and various other commercial purposes. Safe and efficient drilling operations are critical to the global economy.

However, drilling operations are often complicated by the nature of the subsurface. For instance, rather than being uniform, the subsurface often comprises many different layers of substances, including layers of different rocks, sands, silts, and so forth. Each of these substances may require specific drilling parameters. Further, encountering an unexpected substance (e.g., encountering granite when expecting to encounter sand) may cause significant damage to the drill and/or result in substantial and costly delays. There is thus a significant incentive to obtain as much information as possible related to the nature of the subsurface.

Imaging the subsurface, further, is also complex. Surface sensors comprising sources and receivers are typically used. These are placed at or near the ground level at a distance from the drilling rig. The sources fire energy pulses into the ground (i.e., into the subsurface) and the receivers detect the reflected pulses as seismic data from the subsurface (generally as pressure in hydrophone and particle velocity in geophone receivers). Processing and/or inverting this seismic data can provide a model of the subsurface that may be used to further guide drilling operations. However, these surface-only images still lack resolution. In particular, as the sources fire from the surface, the ray path coverage can be drastically non-uniform, depending on the complexities of the subsurface structure. Rays follow the shortest path; hence, they tend to bend toward high-velocity zones and deviate from low-velocity regions. This behavior results in having specific regions in the subsurface where seismic energy penetrates weakly. These regions are in the shadow zone of the seismic acquisition. Also, logistics and economic constraints can limit the extent and density of the seismic sources and receivers, which in turn can reduce the ray path converge of the subsurface. These factors result in an uneven and/or incomplete understanding of the subsurface.

Multiple techniques have been proposed to mitigate these problems. In particular, there has been substantial research into a technique known as Full Waveform Inversion ("FWI", see [1]). FWI is a computational framework that transforms the recorded seismic data to the high-resolution rock properties of the subsurface. FWI is an ongoing and active area of research in industry and academia and it plays a promising and increasingly relevant role in oil/gas exploration. However, FWI is a nonlinear and ill-posed optimization problem and requires specific criteria such as low-frequency seismic data, dense acquisition geometry, and efficient solvers. These criteria are usually not satisfied in real-world applications.

Accordingly, there is a need for techniques that can mitigate the deficiencies of the current art and provide more accurate images of subsurfaces around drilling operations, thus enabling more efficient and safer drilling.

SUMMARY

This document discloses a system and method for guiding a drill using a subsurface model generated by successive full waveform inversions (FWI) on surface data and seismic-while-drilling (SWD) data. A server receives surface data from at least one surface sensor that is recording the elastic energy radiated from surface seismic source and SWD data from at least one surface or at least one subsurface (i.e., deployed in the nearby wells) sensor that is recording the elastic energy radiated from the interaction of the drillbit with the rock while drilling. The server also receives the top-drive hook load and hook-speed information (i.e., measurements from a top-drive coupled to the drill). In some embodiments, the server also receives crosswell data from at least one downhole sensor in a nearby well location. A drillbit source signature estimation is performed, on the SWD data, in the server by blind deconvolution method or by using drill string modeling and a top-drive measurements approach. The server then performs FWI on the surface data by using the background subsurface velocity obtained by kinematic analysis of surface seismic data, to obtain an updated approximation of the subsurface velocity. The new approximation along with the drillbit source signature is then used when performing FWI on the SWD data. The resulting subsurface velocity model can be used to guide further drilling, improve well placement, update reservoir models, and improve well production. The method can also provide a high-resolution image of the subsurface. Further approximations using updated data can then be used to produce better/more accurate models.

In a first aspect, this document discloses a system for guiding a drilling rig using a subsurface model, said drilling rig comprising at least a drill and a drill control unit, the system comprising: at least one surface sensor positioned on a ground surface at a distance from said drilling rig, wherein said at least one surface sensor is configured to detect surface seismic data; at least one subsurface sensor coupled to said drill, wherein said at least one subsurface sensor is configured to detect subsurface seismic-while-drilling (SWD) data when said drill is in operation; and a server operatively connected to said at least one surface sensor and to said drill control unit, and wherein server is configured to process said surface seismic data using a first full waveform inversion (FWI) to thereby produce a first approximation of a subsurface surrounding said drill, and wherein said server is further configured to process said first approximation, said SWD data, and a drillbit source signature related to said drill using a second FWI, to thereby produce said subsurface model, and wherein said subsurface model is used to guide said drilling rig.

In a further embodiment, this document discloses a system wherein instructions are provided to said drill control unit based on said subsurface model.

In a further embodiment, this document discloses a system wherein said drill comprises a drill string and a drillbit and wherein said drillbit source signature is based on characteristics of at least one of said drill string and said drillbit.

In a further embodiment, this document discloses a system wherein said server removes noise from said surface seismic data and said SWD data before performing FWI.

In a further embodiment, this document discloses a system wherein said surface seismic data and said SWD data are gathered in the form of at least one of: seismic pressure information and seismic particle velocity information.

In a further embodiment, this document discloses a system wherein said subsurface has a non-uniform composition.

In a further embodiment, this document discloses a system wherein said drill is used for at least one of: exploratory purposes; extraction purposes; scientific purposes; and commercial purposes.

In a further embodiment, this document discloses a system wherein at least one other subsurface sensor in a nearby well is configured to detect subsurface crosswell seismic-while-drilling (SWD) data when said drill is in operation, and said crosswell SWD data is processed with said SWD data by said server.

In a further embodiment, this document discloses a system wherein at least one other subsurface sensor in a nearby well is configured to detect subsurface crosswell seismic-while-drilling (SWD) data when said drill is in operation.

In a further embodiment, this document discloses a system wherein said surface seismic data and said SWD data are gathered in the form of seismic generated pressure wavefield in hydrophone sensors and seismic generated particle velocity in geophone sensors.

In a second aspect, this document discloses a method for guiding a drilling rig using a subsurface model, wherein said drilling rig comprises at least a drill, a drill support structure, and a drill control unit, and wherein said drill is positioned below a ground surface when said drill is in operation, the method comprising the steps of: obtaining surface seismic data using at least one surface sensor positioned on said ground surface at a distance from said drilling rig; processing said surface seismic data using a first full waveform inversion (FWI) to thereby produce a first approximation of a subsurface surrounding said drill; obtaining seismic-while-drilling (SWD) data from at least one subsurface sensor coupled to said drill; determining a drillbit signature; processing said first approximation, said drillbit source signature, and said SWD data using a second FWI to thereby produce said subsurface model; and using said subsurface model to guide said drilling rig.

In a further embodiment, this document discloses a method wherein instructions are provided to said drill control unit based on said subsurface model.

In a further embodiment, this document discloses a method wherein said drill comprises a drill string and a drillbit and wherein said drillbit source signature is based on characteristics of at least one of said drill string and said drillbit.

In a further embodiment, this document discloses a method further comprising a step of removing noise from said surface seismic data before performing said first FWI.

In a further embodiment, this document discloses a method further comprising a step of removing noise from said SWD data before performing said second FWI.

In a further embodiment, this document discloses a method wherein said surface seismic data and said SWD data are gathered in the form of at least one of: seismic pressure information and seismic particle velocity information.

In a further embodiment, this document discloses a method wherein said subsurface has a non-uniform composition.

In a further embodiment, this document discloses a method wherein said drill is used for at least one of: exploratory purposes; extraction purposes; scientific purposes; and commercial purposes.

In a further embodiment, this document discloses a method wherein said drillbit source signature is determined using said SWD data.

In a further embodiment, this document discloses a method wherein said drillbit source signature is determined using drill string modeling and top-drive measurements.

In a further embodiment, this document discloses a method wherein at least one other subsurface sensor in a nearby well is configured to detect subsurface crosswell seismic-while-drilling (SWD) data when said drill is in operation, and wherein said crosswell SWD data is processed with said SWD data.

In a further embodiment, this document discloses a method wherein said surface seismic data and said SWD data are gathered in the form of seismic generated pressure wavefield in hydrophone sensors and seismic generated particle velocity in geophone sensors.

In a further embodiment, this document discloses a method wherein at least one other subsurface sensor in a nearby well is configured to detect subsurface crosswell seismic-while-drilling (SWD) data when said drill is in operation.

In a third aspect, this document discloses non-transitory computer-readable media having encoded thereon computer-readable and computer-executable instructions that, when executed, implement a method for guiding a drilling rig using a subsurface model, wherein said drilling rig comprises at least a drill, a drill support structure, and a drill control unit, and wherein said drill is positioned below a ground surface when said drill is in operation, the method comprising the steps of: obtaining surface seismic data using at least one surface sensor positioned on said ground surface at a distance from said drilling rig; processing said surface seismic data using a first full waveform inversion (FWI) to thereby produce a first approximation of a subsurface surrounding said drill; obtaining seismic-while-drilling (SWD) data from at least one surface and/or one subsurface sensor coupled to said drill; processing said SWD data to obtain a drillbit source signature; processing said first approximation, said drillbit source signature, and said SWD data using a second FWI to thereby produce said subsurface model; and using said subsurface model to guide said drilling rig.

In a further embodiment, this document discloses non-transitory computer-readable media wherein instructions are provided to said drill control unit based on said subsurface model.

In a further embodiment, this document discloses non-transitory computer-readable media for implementing a method further comprising a step of removing noise from said surface seismic data before performing said first FWI.

In a further embodiment, this document discloses non-transitory computer-readable media for implementing a method further comprising a step of removing noise from said SWD data before performing said second FWI.

In a further embodiment, this document discloses non-transitory computer-readable media wherein said surface seismic data and said SWD data are gathered in the form of at least one of: seismic pressure information and seismic particle velocity information.

In a further embodiment, this document discloses non-transitory computer-readable media wherein said subsurface has a non-uniform composition.

In a further embodiment, this document discloses non-transitory computer-readable media wherein said drill is used for at least one of: exploratory purposes; extraction purposes; scientific purposes; and commercial purposes.

In a further embodiment, this document discloses non-transitory computer-readable media wherein said drillbit source signature is determined using said SWD data.

In a further embodiment, this document discloses non-transitory computer-readable media wherein said drillbit source signature is determined using drill string modeling and top-drive measurements.

In a further embodiment, this document discloses non-transitory computer-readable media wherein at least one other subsurface sensor in a nearby well is configured to detect subsurface crosswell seismic-while-drilling (SWD) data when said drill is in operation, and wherein said crosswell SWD data is processed with said SWD data.

In a further embodiment, this document discloses non-transitory computer-readable media wherein at least one other subsurface sensor in a nearby well is configured to detect subsurface crosswell seismic-while-drilling (SWD) data when said drill is in operation.

In a further embodiment, this document discloses non-transitory computer-readable media wherein said surface seismic data and said SWD data are gathered in the form of seismic generated pressure wavefield in hydrophone sensors and seismic generated particle velocity in geophone sensors.

In another aspect, this document discloses a system for guiding a drilling rig using a subsurface model, said drilling rig comprising at least a drill and a drill control unit, the system comprising: at least one surface sensor positioned on a ground surface at a distance from said drilling rig, wherein said at least one surface sensor is configured to detect surface seismic data before drilling and seismic-while-drilling (SWD) data when said drill is in operation; at least one sensor coupled to said drill, wherein said at least one sensor is configured to detect top-drive hook load and hook speed measurements; and at least one crosswell subsurface sensor positioned in a nearby well location, wherein said at least one crosswell subsurface sensor is configured to detect crosswell-while-drilling (SWD) data when said drill is in operation; and a server operatively connected to said at least one surface sensor and to said at least one subsurface sensor and to said drill control unit, and wherein server is configured to process said surface seismic data using a first full waveform inversion (FWI) to thereby produce a first approximation of a subsurface surrounding said drill, and wherein said server is further configured to process said first approximation, said SWD data, and a drillbit source signature related to said drill using a second FWI, to thereby produce said subsurface model, and wherein said subsurface model is used to guide said drilling rig.

In another aspect, this document discloses a method for guiding a drilling rig using a subsurface model, wherein said drilling rig comprises at least a drill, a drill support structure, and a drill control unit, and wherein said drill is positioned below a ground surface when said drill is in operation, the method comprising the steps of: obtaining surface seismic data using at least one surface sensor positioned on said ground surface at a distance from said drilling rig; processing said surface seismic data using a first full waveform inversion (FWI) to thereby produce a first approximation of a subsurface surrounding said drill; obtaining seismic-while-drilling (SWD) data from at least one subsurface sensor disposed in a crosswell and from at least one surface sensor positioned on said ground surface at a distance from said drilling rig and Hook load and Hook speed data from at least one sensor coupled to said drill; determining a drillbit signature; processing said first approximation, said drillbit source signature, and said SWD data using a second FWI to thereby produce said subsurface model; and using said subsurface model to guide said drilling rig.

In another aspect, this document discloses non-transitory computer-readable media having encoded thereon computer-readable and computer-executable instructions that, when executed, implement a method for guiding a drilling rig using a subsurface model, wherein said drilling rig comprises at least a drill, a drill support structure, and a drill control unit, and wherein said drill is positioned below a ground surface when said drill is in operation, the method comprising the steps of: obtaining surface seismic data using at least one surface sensor positioned on said ground surface at a distance from said drilling rig; processing said surface seismic data using a first full waveform inversion (FWI) to thereby produce a first approximation of a subsurface surrounding said drill; from at least one subsurface sensor positioned on said crosswell and from at least one surface sensor positioned on said ground surface at a distance for said drilling rig and hook load and hook speed data from at least one sensor coupled to said drill; processing said SWD data or using said hook load and hook speed data and said drill string modeling to obtain a drillbit source signature; processing said first approximation, said drillbit source signature, and said SWD data using a second FWI to thereby produce said subsurface model; and using said subsurface model to guide said drilling rig.

BRIEF DESCRIPTION OF THE DRAWINGS

The present invention will now be described by reference to the following figures, in which identical reference numerals refer to identical elements and in which.

DETAILED DESCRIPTION

Figure 1:
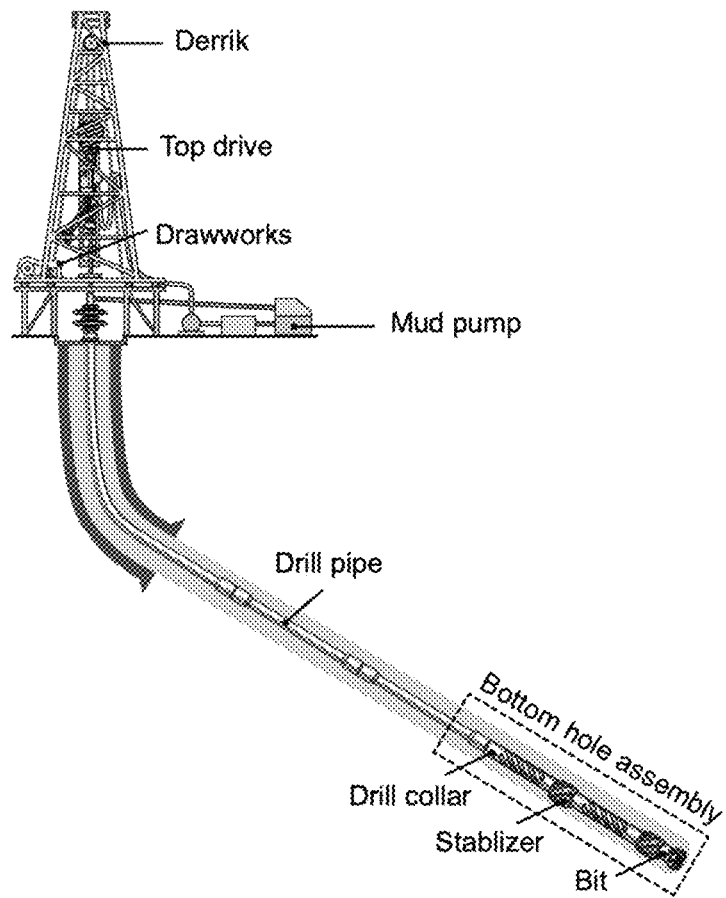
FIG. 1 is a schematic representation of a drilling rig known from the prior art.

For clarity, Table 1 outlines the meaning of terms and symbols used throughout this document:

TABLE 1

| Parameters | |
|---|---|
| E | pipe Young's modulus |
| ρ | pipe mass density |
| $c_\xi$ | axial wave velocity |
| $k_\xi$ | viscous shear stress |
| A | cross-sectional area of the drill string |
| L | drill string length |
| $M_b$ | mass of the lumped BHA (bottom hole assembly) |
| $\omega_{bit}$ | bit angular velocity |
| a | bit radius |
| ζ | characterization of the cutting force |
| $w_f$ | friction weight |
| ϵ | intrinsic specific energy of the rock |
| $\rho_f$ | density of the rock |
| $V_p$ | rock compressional velocity |
| $V_s$ | rock shear velocity |
| Dependent variables | |
| ξ | drill string axial displacement |
| w | drill string axial force |
| v | drill string axial velocity |
| u, z | drill string axial Riemann invariants |
| $w_0$ | weight on the drill string |
| $U_r$ | P-wave radiation |
| $U_\phi$ | S-wave radiation |
| Independent variables | |
| t | time |
| x | position relative to top of drill string |
| Other symbols | |
| ϵ | small number in Huber norm for approximation of the $L_1$ norm |
| λ | regularization parameter |
| d | seismic data |
| e | noise term in SMBD (sparse multi-channel blind deconvolution) |
| n | noise in the data |
| r | reflectivity |
| y | concatenation of the reflectivity series in all of the channels |
| A | channels combination matrix for SMBD |
| D | convolution matrix of seismic data, d |
| F | Toeplitz matrix built from the drillbit source signature time series |
| J | maximum number of channels per shot gather |
| N | convolution matrix of noise |

TABLE 1-continued

| Subscripts | |
|---|---|
| i | channel index |
| j | channel index |
| p | channel index |
| q | channel index |
| Superscripts | |
| T | transpose |

Additionally, to better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

The present invention provides a system and method for guiding drilling operations using a subsurface model that is based on full waveform inversions of surface seismic data and seismic-while-drilling data (which may be gathered from at least one sensor at the surface and/or at least one sensor coupled to the drillbit and/or, in some embodiments, at least one sensor disposed in a nearby well). Surface seismic data is collected from at least one surface sensor and processed by a server that uses FWI to obtain a first approximation of the subsurface. That first approximation is then reprocessed using a second FWI process, along with a drill source signature that has been estimated by processing the SWD data gathered from at least one sensor coupled to the drillbit or by analysing top-drive hook load and hook-speed measurements through drill string modeling. This second processing step produces a more robust and more accurate subsurface model than simply using surface data alone. The second processing is complimentary to the first processing approximation. Successive FWI inversion of surface seismic and SWD data results in providing a more accurate subsurface velocity model. The method also alleviates the need for measuring low-frequency components in surface seismic data.

A schematic drilling rig is shown in FIG. 1. As can be seen, the rig includes an above-ground support structure that sits over a well. The drill portion of the drilling rig system comprises three components: a rotating mechanism (usually a rotary table or a top drive), a drill string, and a bottom hole assembly (BHA), which includes a drillbit. The torsional and axial motions generated at the surface are transferred to the drill string and the BHA. The drill string is an interconnection of pipes, which are steel tubes with a length of typically 10 m. These pipes are usually run in tension, to avoid the effect of fatigue due to a potential helical buckling. Further, the pipes are hollow, which allows an above-ground mud pump to inject a drilling fluid to clean, cool, and lubricate the bit to evacuate the rock cuttings. The BHA comprises the drillbit (i.e., a rock cutting device), a series of relatively heavy pipe sections, known as drill collars (much thicker pipes than those used in the drill string, and which provide the necessary weight to perform the perforation), stabilizers (at least two spaced apart) which prevent the drill string from unbalancing, and "shock subs" (not shown in FIG. 1) that absorb vibrations between the bit and the drill-collars. While the BHA length remains constant, the total length of the drill string may increase as the borehole depth does. The weight exerted on the bit impacts the performance of the cutting process, measured by the Rate-Of-Penetration (ROP).

As would be understood, the drillbit may have seismic velocity sensors and/or accelerometers attached or coupled thereto, or, in some embodiments, incorporated therein. Note that, within the framework of the present invention, there is no need to place sensors close to the drillbit (e.g., in the BHA). As should also be clear, FIG. 1 is not to scale. The drill portion may be up to several thousand metres below ground level.

Figure 2:
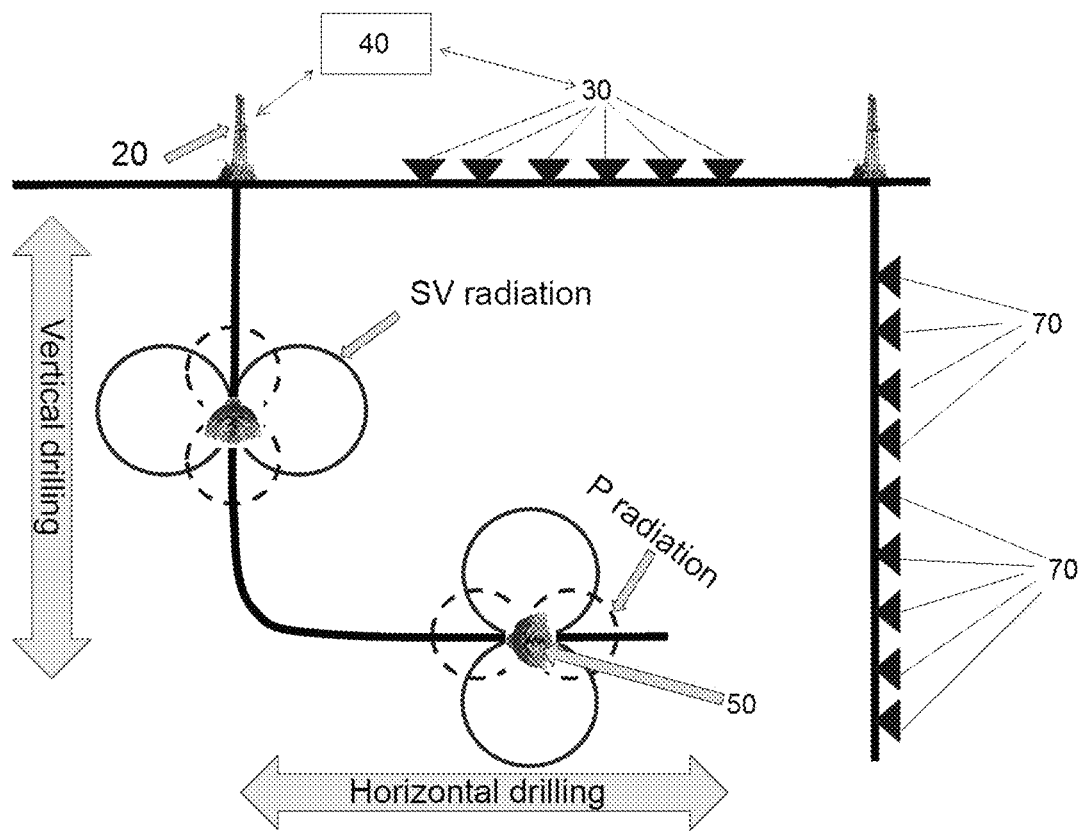
FIG. 2 is a schematic representation of a system according to one aspect of the present invention.

FIG. 2 is a schematic representation of the system 10 of the present invention. The drilling rig 20 comprises a support structure (above ground level) and a drill. Additionally, the drilling rig 20 comprises a drill control unit. As would be understood, such a control unit can take many forms and generally comprises both software and hardware components. Moreover, the control unit may comprise multiple separate modules. The control unit is used to direct, control, and/or instruct the drill (e.g., to control speed, rotation, retraction, angle, etc.). The drill string is shown as the black line extending from the drill rig 20. The schematic drillbit can be seen in two places in FIG. 2 (i.e., shown schematically at different times), beginning with a position for vertical drilling on the left of the image and moving to horizontal drilling (at the lower centre of the image) as the borehole depth increases. Of course, the person skilled in the art would understand that the borehole may have any desirable and/or suitable geometry, depending on the geological profile of the relevant area.

FIG. 2 further depicts schematic surface sensors 30. While it is preferred that as many surface sensors as possible be used to obtain the most accurate data regarding the subsurface, a single surface sensor 30 may be sufficient. The sensor(s) 30 are placed at a distance from the drilling rig 20, to better intercept the seismic energies. The surface sensors can record surface seismic information and, depending on the implementation, also record SWD data (as will be further described below). The surface sensors 30 (and other sensors used herein) may include any conventional form of sensor, including sensors configured to detect seismic-generated pressure wavefield data (e.g., hydrophone-based sensors) and sensors configured to record seismic-generated particle velocities (e.g., geophone-based sensors).

As is well-known, depending on the type of drilling wells (i.e., vertical or horizontal drilling), the seismic radiation patterns would be different. In vertical drilling, the drillbit radiation patterns in the vertical direction are dominated by the pressure component, (i.e., P waves) and in the horizontal direction the drillbit radiation patterns are dominated mainly by the shear component (i.e., S waves).

Thus, in horizontal drilling, receivers 30 at the surface can record the pressure wave field and provide information-rich SWD data. However, in such horizontal drilling, the drillbit radiation patterns in the vertical direction are dominated by the shear component, (i.e., by S waves), and in the horizontal direction is mainly dominated by the pressure component, (i.e., by P waves). Accordingly, in a horizontal drilling system, the surface receivers 30 cannot record strong pressure components, and thus may not provide a full picture of the seismic environment. Moreover, in deep and ultra-deep drilling, the shear wave field is highly attenuated by the earth and the quality of the SWD data is poor. Thus, in some embodiments, 'downhole' receivers 70 are deployed in the surrounding nearby vertical boreholes and used to record the P component of the seismic waves generated by horizontal drilling. Such data can be referred to as 'downhole' or 'crosswell' data.

As would be clear to the person skilled in the art, any suitable number of downhole sensors 70 may be used, in any suitable number of nearby boreholes. Moreover, in downhole recording using downhole sensors 70, as the distance between the drillbit location and borehole receivers is smaller than the distance between the drillbit and the surface receivers 30, better quality data may be obtained. The downhole/crosswell data also contains a broader frequency range which results in providing high-resolution subsurface images. Of course, as should also be clear, downhole sensors 70 are not required in all embodiments of the invention.

The surface sensors 30 and the drilling rig 20 (and the downhole sensors 70, if used) are both in communication with a server 40. As should be clear, the server 40 may be remote from the drilling rig 20 or may be located at the drilling rig site. Further, the server 40 may, in some embodiments, be integrated into the drill control unit of the drilling rig 20. The server 40 may use any kind of communication method to communicate with the sensors 30 and the drilling rig 20, including wireless or wired communication. In many embodiments, wireless communication may be preferable, particularly where the sensors are located over a great distance from the drilling rig.

Additionally, the server 40 is in communication with at least one subsurface sensor 50 on or coupled to the drillbit. Drillbit-rock interactions generate elastic energy that propagates through the subsurface and are recorded either by surface sensors 30 or by subsurface sources placed in nearby wells. Drillbit-rock interactions also generate vibrations in the drill string and these vibrations are recorded by other sensors (e.g. accelerometers) which are positioned on the top drive. Note that the at least one subsurface sensor noted above transmits seismic information collected while drilling (known as seismic-while-drilling, or SWD, data). This SWD data reflects the seismic energy generated by the drillbit-rock interaction. The server 40 also obtains a drill source signature, which is based on parameters of the drill (i.e., of the drillbit and/or drill string) and top drive measurements, as will be discussed below. The server 40 can then process the seismic-while-drilling data, the drill source signature, and the surface seismic data, using successive FWIs as will be detailed below. The server can also process the SWD data (e.g., using a blind deconvolution approach, which will be detailed below) to obtain the drill source signature. The result of such processing is a robust subsurface model that can be used in guiding further drilling operations. In some embodiments, the server 40 transmits the model directly to the drill control unit and the drill control unit adjusts drilling parameters based on the model. In other embodiments, human operators use the model to determine preferable drilling parameters. In further embodiments, the drill control unit receives the model and adjusts drill parameters accordingly, but a human operator is "on-the-loop" and can correct and/or adjust the drill control unit's directions to the drill as needed.

It should be clear that the various systems and methods disclosed herein have multiple possible applications or uses. The SWD method according to one aspect of the present invention may be used for: geosteering, avoiding risky zones such as high pore-pressure zones and shallow gas zones, improving well placement, improving reservoir models and production, improving drill string dynamics control, improving geomechanical modeling and predictions, and monitoring changes in the reservoir such as fractures in the reservoir and gas leakage. The present invention can also be used in other exploration and engineering projects, such as mining/mineral exploration and tunnel drilling. Additional applications can include: geothermal drilling optimization, subsurface monitoring, caprock integrity monitoring, monitoring carbon dioxide locations for carbon capture, utilization, and sequestration (CCUS) applications, geomechanical estimation of soil and rock geologies in the near surface for engineering purposes, drill string dynamics estimation, and drill string modelling applications, including designing control laws for reducing drill string dynamics, improving rate of penetration (ROP), and increasing drilling efficiency. The person skilled in the art, of course, can comprehend many other specific applications for the systems and methods disclosed herein, all of which fall within the scope of the present invention.

This document discloses a method that allows one sufficient time to precisely control the borehole trajectory and to stay within the desired reservoir zone. Accordingly, the present invention can be used to mitigate the risk of intersecting non-producible zones such as mud-filled channels and lean zones.

In addition to the above, the methods and systems disclosed herein do not rely on measurements obtained from a pilot trace (an accelerometer commonly located on the top drive of the drill rig). Additionally, the methods and systems disclosed herein provide high-resolution subsurface velocities and pre-stack depth migrated images as a by-product. Thus, the present invention can estimate the drillbit source signature, regardless of the quality of the pilot trace. This is especially important when dealing with PDC (polycrystalline diamond compact) bit drilling. PDC bits shear the rocks while drilling and, unless drilled in hard rocks or when the PDC bit is damaged, PDC bit drilling produces weak axial motion (P-wave) along the drill string [2]. Hence, the signal recorded by a pilot trace is not strong enough to provide useful data or surface measurements while drilling with a PDC bit. On the other hand, by eliminating the need for the pilot trace, the methods and systems disclosed herein can measure the elastic energy generated by the PDC bit in nearby wells and provide subsurface images.

Full-waveform inversion of SWD data gives the high-resolution subsurface velocity or physical parameters of the rocks around and ahead of the drillbit. The rock properties provided by full-waveform inversion of SWD data or by inverting the angle, when used in conjunction with drilling parameters, measurement while drilling (MWD) data and cuttings analysis, gives an estimate of the pore pressure at the bit [2].

As mentioned above, the methods and systems disclosed herein also helps to reduce drilling risks and improves the geo-steering decisions for individual production well drilling, including their vertical placement. Further, the methods and systems disclosed herein provide high-resolution ahead-of-the-bit images of the subsurface that identify reservoir boundaries and highlight geological heterogeneities to be used for real-time decision making. The methods and systems disclosed herein may also help predict the shallow gas zones, potential mud loss zones. Additionally, the methods and systems disclosed herein provide subsurface rock velocities while drilling, which can help in updating the drilling parameters and in improving the Rate of Penetration (ROP), and in developing a control mechanism so that the drilling system experiences lesser vibrations.

Drillbit Source Signature
Blind Deconvolution

The blind deconvolution method uses a signal processing algorithm and directly estimates the drillbit source signature from the recorded SWD data. In this approach, we use the blind deconvolution method proposed by [3] to estimate the source signature directly from the data (i.e., the sparse multi-channel blind deconvolution, or "SMBD", algorithm).

In the SMBD algorithm, data is modeled as the convolution of drillbit source signature with a reflectivity series $$d_j = Fr_j + n_j, j=1, \ldots, J, \tag{A1}$$

where F is the convolution matrix built from the drillbit source signature, $r_j$ and $n_j$ are the reflectivity series and noise term in channel j. In [3], the smallest common factor between the channels was found by solving an inverse problem where the solution fits the heterogeneous system of equations and provides a sparse reflectivity series. The drillbit source signature is then produced as a byproduct of the algorithm. The SMBD algorithm estimates the smallest common factor between all of the channels in the SWD data by solving a heterogeneous system of equations, by convolving the data of channel p with the reflectivity of channel q and the data of channel q with the reflectivity of channel p. After some algebraic manipulations, we get $$D_p r_q - D_q r_p = N_p r_q - N_q r_p \tag{A2}$$

where $D_p$ and $N_p$ are the convolutional matrices built from $d_p$ and $n_p$, respectively. After performing all combinations similar to Eq'n (A2) between all of the channels, the following heterogeneous system of equations is produced:

$$Ay = e \tag{A3}$$

where $$A = \begin{pmatrix} D_2 & -D_1 & & & & \\ D_3 & & -D_1 & & & \\ D_4 & & & -D_1 & & \\ \vdots & & & & \ddots & \\ & D_3 & -D_2 & & & \\ & D_4 & & -D_2 & & \\ & \vdots & & & \ddots & \\ & & & & D_J & -D_{J-2} \\ & & & & D_J & -D_{J-1} \end{pmatrix} \tag{A4}$$

and $$y = [r_1, r_2, r_3, \ldots, r_J]^T \tag{A5}$$

The term e is the concatenation of vectors similar to the right-hand side of Eq'n (04). To find the reflectivity series that fit the heterogeneous system of equations represented in Eq'n (03), SMBD solves the following cost function $$\hat{y} = \operatorname*{argmin}_{y} \frac{1}{2} \|Ay\|_2^2 + \lambda \sum_i \left( \sqrt{y_i^2 + \epsilon^2} - \epsilon \right), \text{ subject to } y^T y$$

where $\lambda$ is a regularization parameter, and $\epsilon$ is a small number. The regularization term in the cost function is the Huber norm that promotes sparsity in the final solution. After finding the sparse reflectivity series, the drillbit source signature is estimated by a least-squares matching filter in the frequency domain that matches the data to the reflectivity series.

Drill String Modeling and Top-Drive Measurements

The second approach for estimating the drillbit source signature relies on drill string modeling and top-drive measurements. Through modeling the drill string dynamics and measuring the surface axial force of the drill string ('hook load') and the axial velocity of the drill string ('hook speed') time series, it is possible to estimate the drillbit source signature. The estimated drillbit source signature when used in combination with the SWD data can also estimate the velocity of rocks that are interacting with the drill.

It should also be noted that, in some embodiments, as described in [4], machine learning methods can also be used to estimate the drillbit source signature. For instance, a Fast Fourier Transform (FFT) may be applied to the top-drive force and velocity, and relevant attributes, such as the dominant frequencies and their corresponding gains, may be chosen. Then, once the relevant attributes are paired with corresponding E values, a neural network may be trained to estimate the drillbit source signature. The training may use a training set of, e.g., one thousand simulations for which the parameters of interest are modified between each run.

To obtain the drillbit source signature other than through machine learning methods, an algorithm that uses drill string dynamics modeling and measured surface axial force (hook load) and velocity (hook speed) time series may be used. Employing a distributed axial dynamics of the drill string, the force exerted on the bit, i.e., the drill source signature, can be expressed as a function of the top-drive force and top-drive velocity, which are measurable values, without depending on the downhole boundary condition or the subsurface. Combining this relationship with an SWD approach, where the direct arrivals in the far-field radial and angular displacement are expressed as a function of the force-on-bit and rock velocity, results in estimating the velocities of rocks interacting with the drillbit while drilling.

The relevant variables are shown in Table 1. Additionally, in what follows, the following equation holds true:

$$1_\Omega(\theta) = \begin{cases} 1, & \text{if } \theta \in \Omega \\ 0, & \text{otherwise.} \end{cases}$$

Axial Dynamics of the Drill String

The rotary table sets the drill string into a rotary motion around its main axis, and the dynamics of interest can be derived by assuming elastic deformations and using equations of continuity and state. More precisely, a distributed model has been proposed in [5] and in [6], to describe the evolution of the axial displacement $\xi(t,x)$ of the drill string which is a function of $(t,x)$ evolving in $\{(t,x)|0<t<T, x \in [0, L]\}$ (where L is the total length of the drill string and T is a positive time).

The axial motion satisfies the following wave PDE:

$$\frac{\partial^2 \xi}{\partial t^2}(t, x) - c_\xi^2 \frac{\partial^2 \xi}{\partial x^2}(t, x) = -k_\xi \frac{\partial \xi}{\partial t}(t, x) \tag{1}$$

where $c_\xi = ((E/\rho))^{1/2}$, $\rho$ being the pipe mass density, E being the pipe's Young's modulus, and $k_\epsilon$ being a damping coefficient representing the viscous shear stresses acting on the pipe. The axial force associated with $\xi$ can be found from the strain, given as the local relative compression $$w(t, x) = AE \frac{(\xi(t, x) - \xi(t, x + dx))}{dx}. \tag{2}$$

In Eq'n (07), A is the cross-sectional area of the drill string and $dx \to 0$ is the infinitesimal axial position increment. The axial velocity satisfies $$v(t, x) = \frac{\partial \xi(t, x)}{\partial t}.$$

It can easily be shown from Eq'n (06) that the axial force and velocity satisfy the following set of PDEs:

$$\frac{\partial w(t, x)}{\partial t} + AE \frac{\partial v(t, x)}{\partial x} = 0 \tag{3}$$

$$\frac{\partial v(t, x)}{\partial t} + \frac{1}{A\rho} \frac{\partial w(t, x)}{\partial x} = -K_\xi v(t, x). \tag{4}$$

The topside weight (topside boundary condition) on the drill string, w(t, 0), corresponds to the system actuation. The downhole boundary condition at x=L is obtained from a force balance on the lumped BHA. These two boundary conditions will be discussed below.

Topside Boundary Condition

In the typical drilling system (i.e., the drilling system of FIG. 1) the drill string is connected at the top to the top-drive suspended over the drill floor by the traveling block. This block is connected by several drill lines with one attached to the deadline anchor and the other being spooled on a drum controlled by AC induction motors. Thus, we can assume that the operator controls the weight on the drill string $w_0(t) = w(t, 0)$. This yields $$-EA \frac{\partial \xi(t, x)}{\partial x} = w_0(t) \tag{5}$$

where $w_0$ is considered as an input.

Downhole Boundary Condition: Bit-Rock Interaction

The lowermost section of the drill string is typically made up of drill collars which may have a great impact on the drill string dynamic due to their added inertia. In particular, the transition from pipes to collars in the drill string will cause reflections in the traveling waves due to the change in characteristic line impedance. Rigorously speaking, we should write a new wave PDE for the BHA. This PDE would be analogous to Eq'n (1) but using the BHA density and Young's modulus. However, as the length of the BHA (~200 m) is much smaller than the length of the drill string (~2000 m), its effect can be lumped into an ODE coupled with the drill string. Thus, the downhole boundary condition at x=L can be obtained from a force balance on the lumped BHA. This yields $$M_b \frac{\partial v}{\partial t}(t, L) = -w_b(v(t, L), w(t, L)) + w(t, L) \tag{6}$$

where $M_b$ is the mass of the lumped BHA and $w_b(\cdot,\cdot)$ is the force acting from the rock on the BHA through the drilling bit, known as the 'weight on bit'. From [7] and [8], the weight on bit can be related to the bit velocity by considering the combined depth of cut per revolution.

More precisely, the combined depth of cut per revolution d(t) satisfies the following equation $$d(t) = \frac{v(t, L)}{\omega_{bit}}$$

where the bit angular velocity $\omega_{bit}$ is assumed constant here. The cutting force is finally expressed as $$w_b(v(t,L),w(t,L))=w_f+Kd(t)=w_f+\alpha\varsigma\epsilon d(t) \quad (7)$$

where $w_f$ is a friction weight independent of the bit velocity (and therefore, constant) while K=αçϵ, with α being the bit radius, ç a characterization of the cutting angle, and ϵ the intrinsic specific energy of the rock. Thus, the boundary condition (6) rewrites as $$M_b \frac{\partial^2 \xi}{\partial t^2}(t, L) = -\frac{\alpha\varsigma\epsilon}{\omega_{bit}} \frac{\partial \xi(t, L)}{\partial t} - w_f - EA\frac{\partial \xi(t, L)}{\partial x}. \quad (8)$$

SWD Technique

In modelling SWD data gathering, each layer in the subsurface is considered to be a homogenous and isotropic medium. In this model, each layer is recognized by its seismic velocities. The seismic velocities depend on the well-known Lamé parameters. In the drilling process, the impact of the drillbit on the rock generates vibrations. These vibrations vary depending on the drilling configurations and the Lame parameters of the drilled rock. For example, the pure axial motion of the drillbit in the vertical direction generates pressure wavefield in the direction of motion and an SV (shear wave vertical component) wavefield in the direction perpendicular to the drillbit motion. The vertical-only motion of the drillbit does not generate SH (shear wave horizontal component) wavefield. However, if the drillbit rotates in the drilling process, the impact of rotating motion on the layer can generate SH waves. These radiated seismic wave energies can be recorded by the receivers at the surface. However, the additional SWD data provides substantially more data about the bit-rock interaction than can be simply gathered at the surface.

Figure 3A:
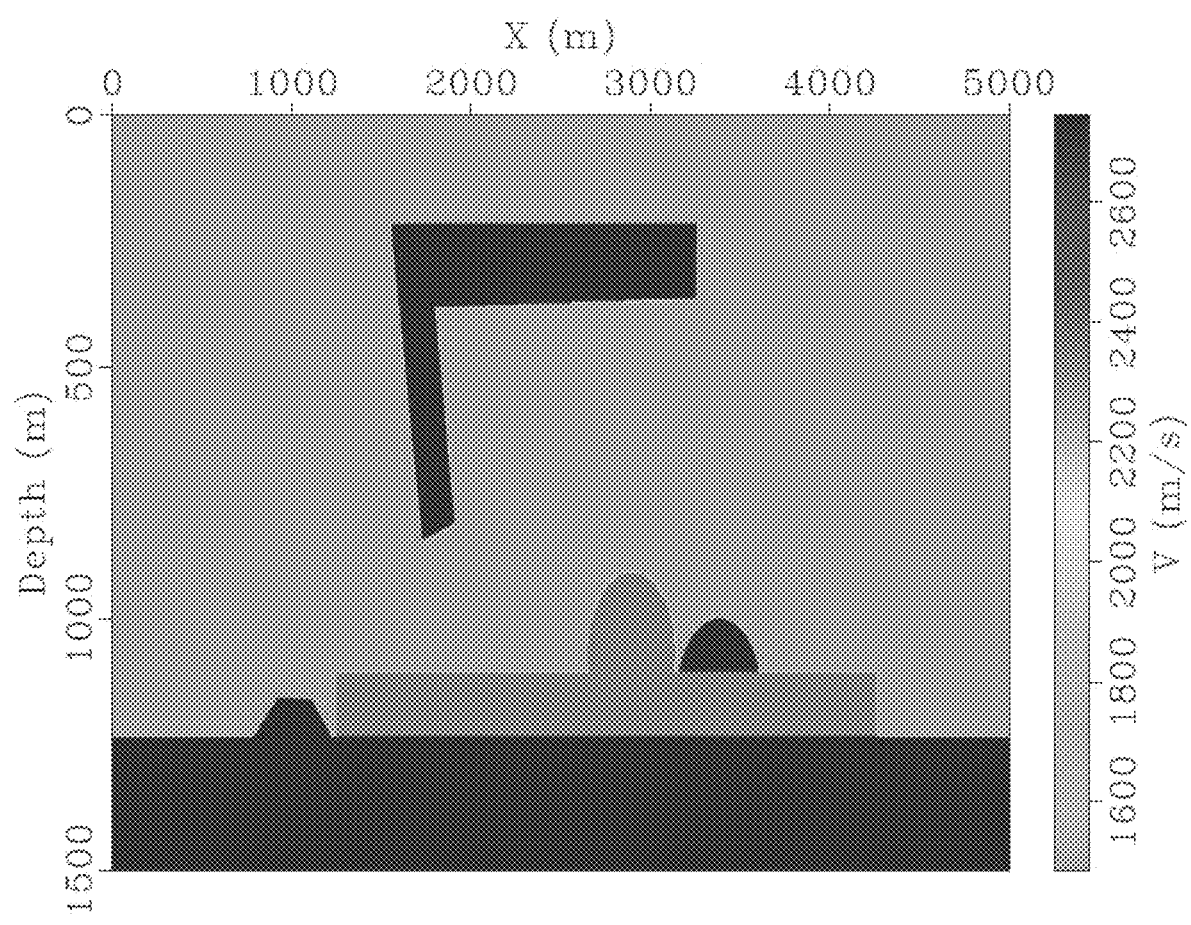
FIG. 3A shows an exemplary subsurface velocity model for a physical model setup.
Figure 3B:
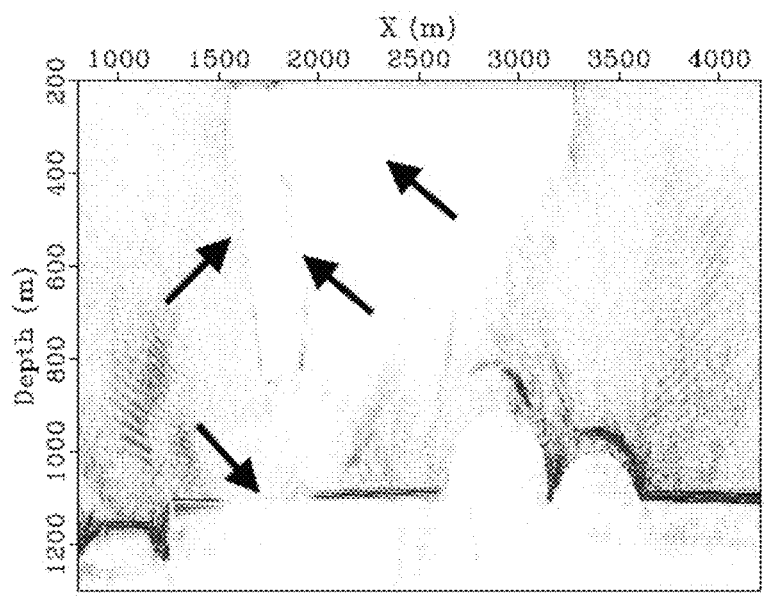
FIG. 3B shows a subsurface image obtained by processing surface shots recorded over the exemplary model used for FIG. 3A.
Figure 3C:
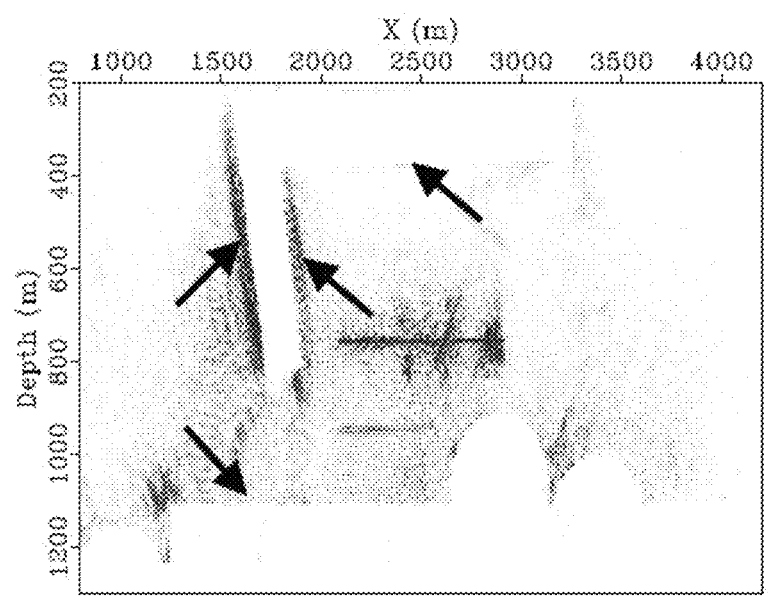
FIG. 3C shows a subsurface image obtained by processing subsurface seismic shots recorded over the exemplary model used for FIG. 3A.

As an example, FIGS. 3A, 3B and 3C show physically modeled images of ground truth subsurface velocity, and subsurface images provided by processing surface and SWD data. FIG. 3A shows a ground truth subsurface velocity model. FIG. 3B shows a subsurface image provided by processing surface data only, and FIG. 3C shows a subsurface image provided by processing SWD data only. As can be seen, there is a non-uniform resolution of subsurface layers in this subsurface. In particular, there is an L-shaped region near the centre top of the subsurface. This region is not clearly defined in FIG. 3B (the surface only image). However, the regions' borders are much more clearly indicated in FIG. 3C (the SWD image). (Note that in the model, the region was constructed of Plexiglass suspended in water.)

Figure 4A:
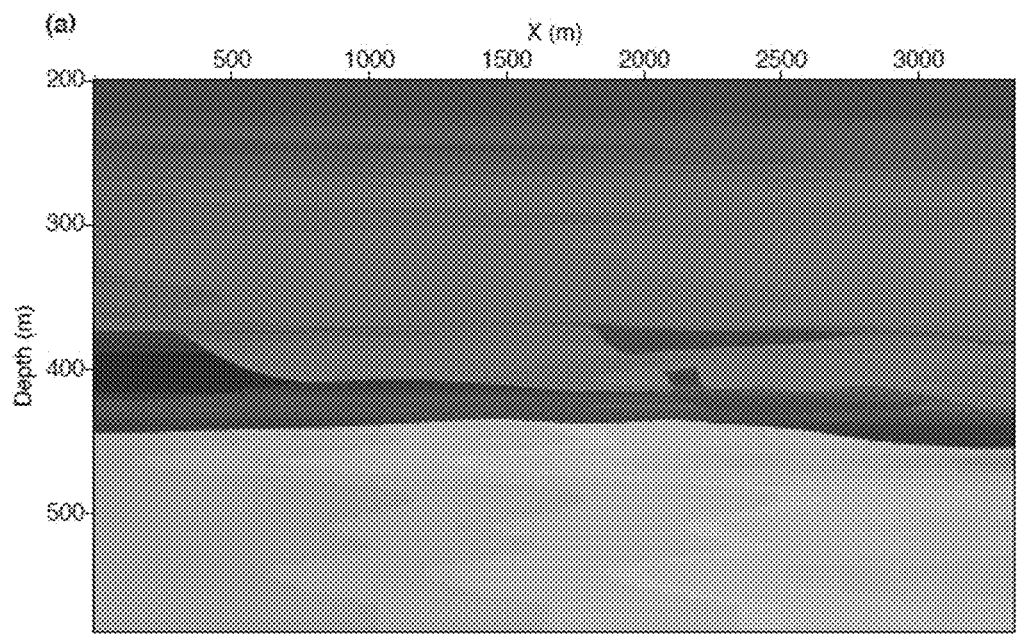
FIG. 4A shows a synthetic velocity model representative of the McMurray Formation.
Figure 4B:
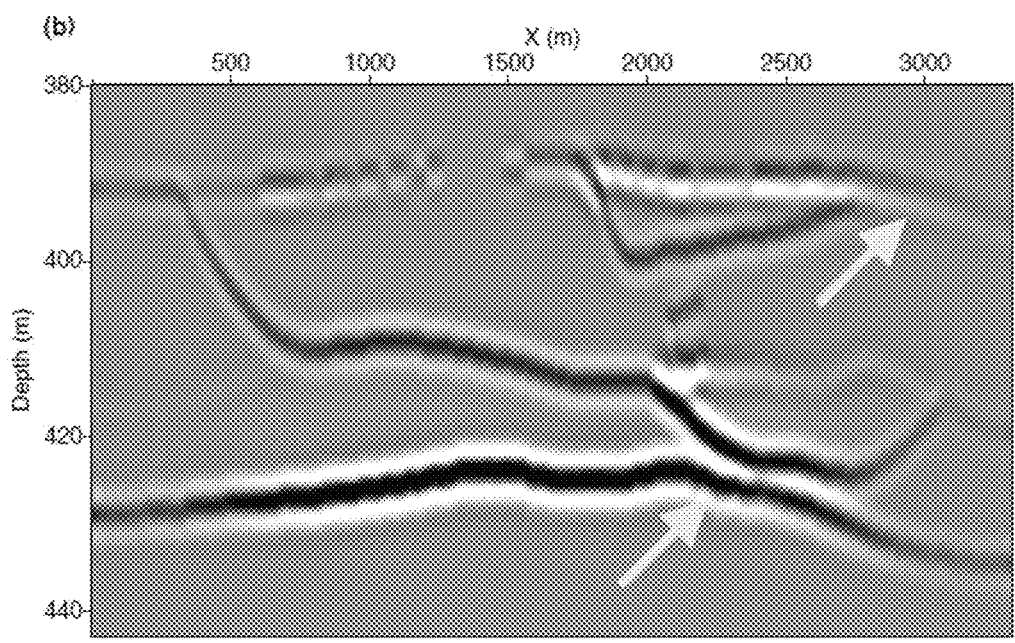
FIG. 4B shows a subsurface image obtained by processing surface seismic data simulated over the synthetic velocity model of FIG. 4A.
Figure 5A:
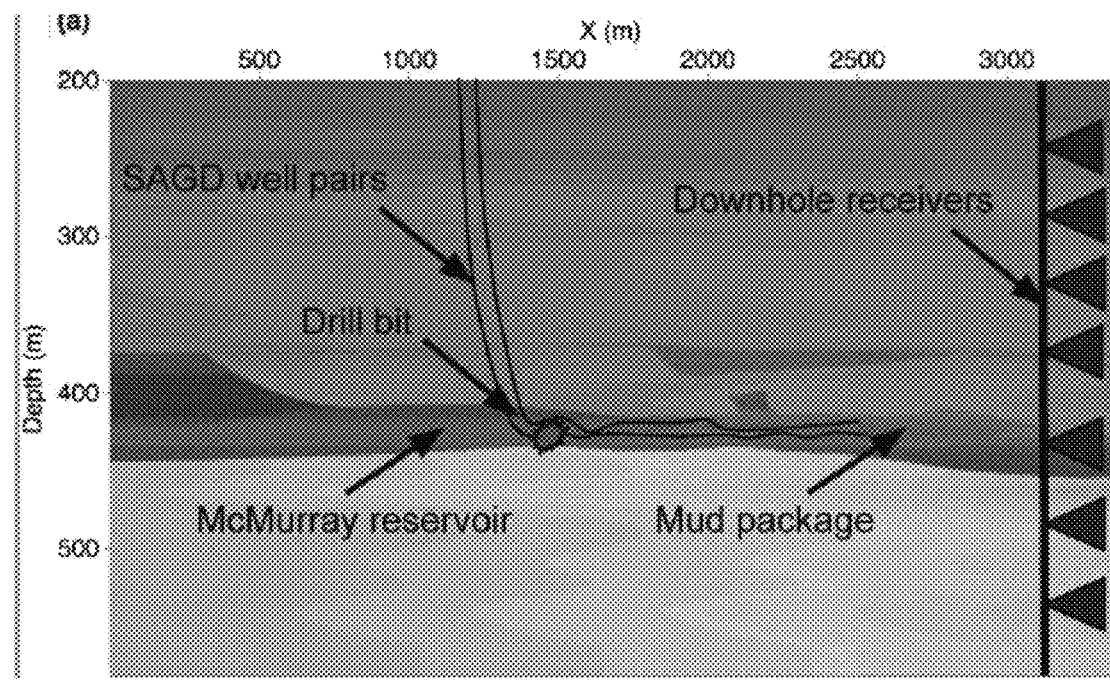
FIG. 5A shows a schematic representation of a system for seismic-while-drilling acquisition overlaid on the velocity model of FIG. 4A.
Figure 5B:
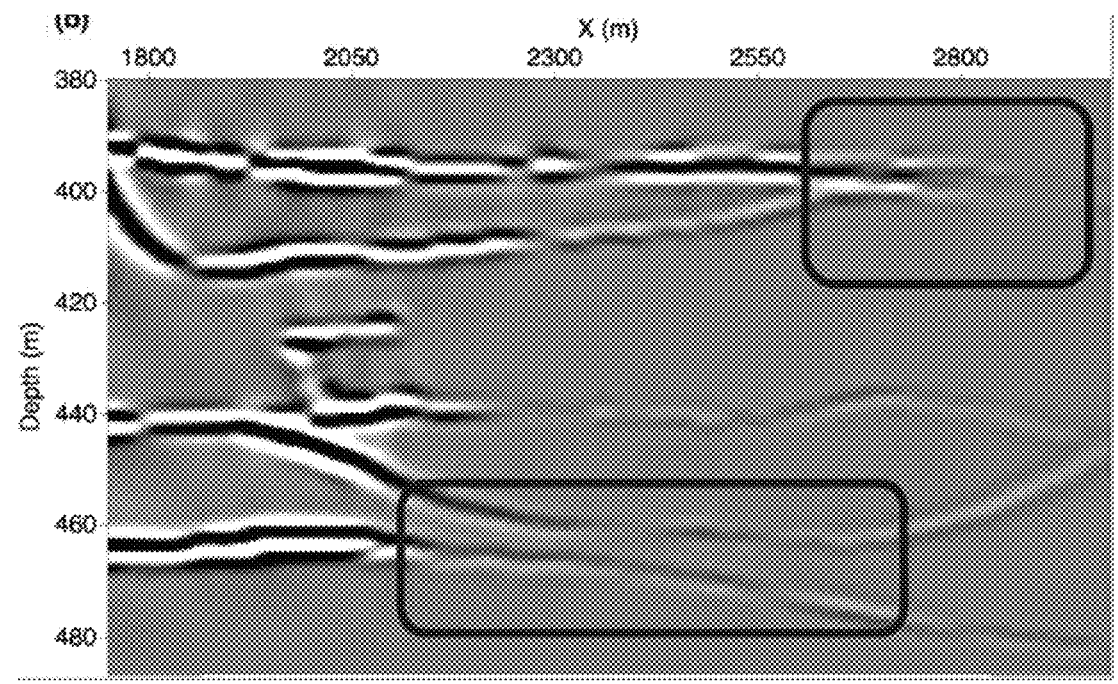
FIG. 5B shows a subsurface image obtained by processing SWD data simulated over the velocity model of FIG. 4A.

FIGS. 4A, 4B, 5A, and 5B, further, show synthetically modeled images of ground truth subsurface velocity, and subsurface images provided by processing surface and SWD data. Specifically, FIG. 4A shows a synthetic velocity model representative of the well-known McMurray Formation, located in Alberta. FIG. 4B shows a surface seismic image over the model of FIG. 4A (i.e., an image provided by processing surface seismic data for the velocity model of FIG. 4A). FIG. 5A shows the velocity model of FIG. 4A, overlaid with a schematic representation of a drilling system for seismic-while-drilling acquisition according to systems and methods disclosed herein. FIG. 5B further shows a subsurface image provided by processing SWD data for the velocity model of FIG. 4A.

Figure 6:
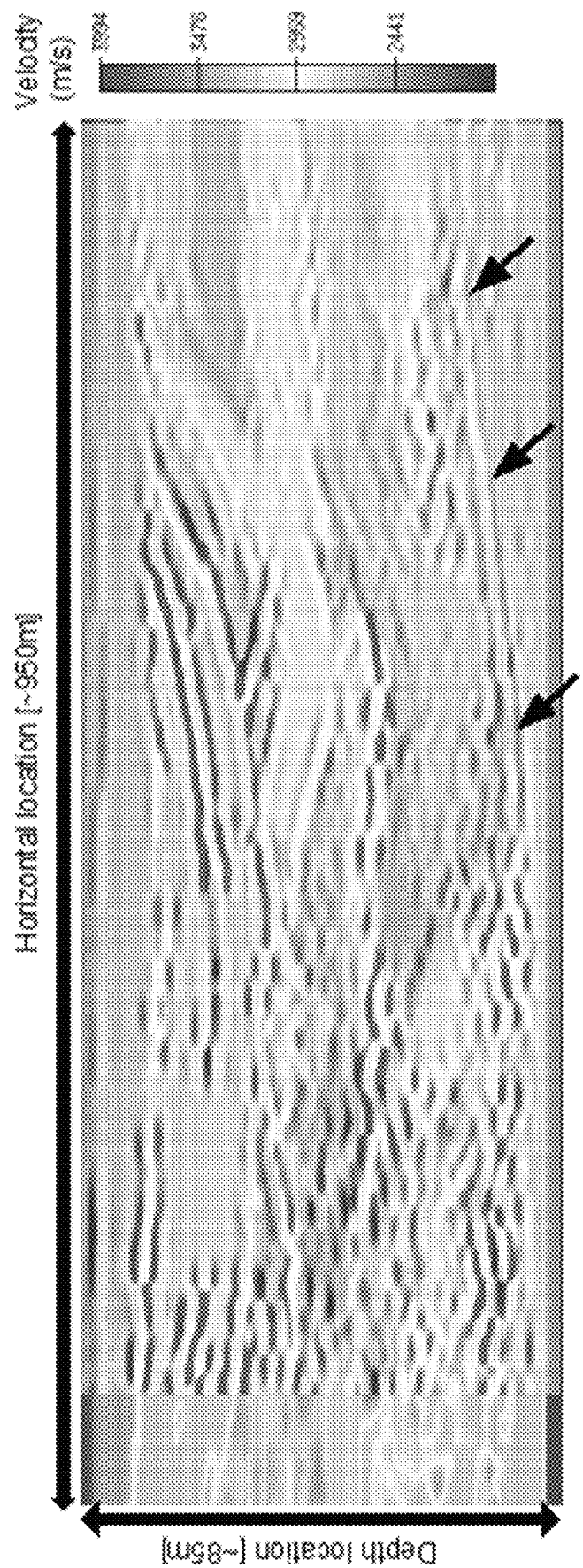
FIG. 6 shows a subsurface image obtained by processing crosswell SWD data simulated over a synthetic velocity model representative of the McMurray Formation.

FIG. 6, further, shows a subsurface image obtained by processing simulated crosswell data for a synthetic velocity model of the McMurray Formation. 15 equally spaced wells were simulated over the model, and crosswell SWD data was obtained from one of such wells while horizontal drilling process was simulated at a different well. The crosswell SWD data thus obtained efficiently revealed the simulated mudstone/reservoir boundary.

Figure 7:
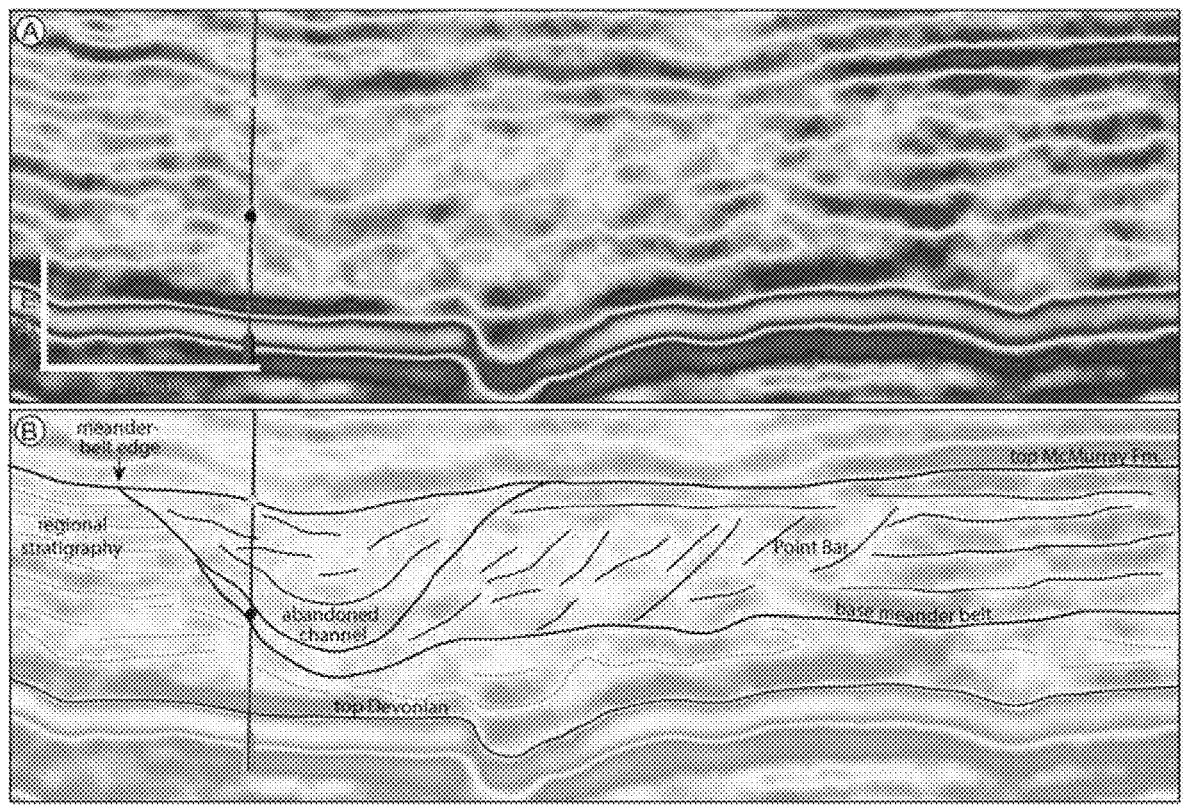
FIG. 7 shows a subsurface image obtained by processing conventional seismic data recorded over the McMurray Formation in surface seismic field acquisition, according to the prior art.

FIG. 7, in contrast, shows conventional imaging of the McMurray Formation. Section (a) of FIG. 7 shows a seismic depth cross section of the McMurray Formation and section (b) shows a line trace overlaid on the image of section (a), showing the elements of meander-belt deposits at different stratigraphic levels. As can be seen, the 3D-seismic resolution of such conventional techniques is relatively poor up to 10 m above the unconformity (see also [9]).

It should be clear that the SWD method is most efficient when the subsurface region is highly heterogeneous or structurally complex. While the method can be used in any region, in regions where the subsurface is too complex (e.g., sub-salt structures in the Gulf of Mexico) surface seismic struggles to provide a reliable subsurface image. This is because, in these regions, rays bend toward high-velocity zones and away from low-velocity regions. Thus, rays non-uniformly cover the subsurface, and there will be seismic shadow zones in the subsurface. The surface seismic image cannot recover the subsurface information present in those shadow zones. In other words, the surface seismic image suffers from non-uniform illuminations. In these circumstances, SWD data provide complementary ray coverage and improve subsurface illumination.

While drilling, the drillbit-rock interaction radiates significant elastic, P-wave and S-wave, energy. In isotropic and homogeneous media, these radiations are functions of the drillbit point force and the seismic velocities of rocks. It has been shown that, for a roller-cone drillbit, the seismic radiation pattern proceeding from the axial component drillbit impacts can be modeled as a transient, monopolar point force acting along the axis of the borehole. These radiations can be measured at the surface using the drillbit seismic methods described above. More precisely, with $U_r$ the P-wave radiation and $U_\phi$ the S-wave motion, the far-field radial displacement resulting from the point force w(t, L) satisfies the following relation:

$$U_r(r, \phi, t) = \frac{A_1 \cos(\phi)}{\rho_f V_p^2 r} w\left(t - \frac{r}{V_p}, L\right) \quad (9)$$

and the far-field angular displacement satisfies $$U_\phi(r, \phi, t) = \frac{A_1 \sin(\phi)}{\rho_f V_s^2 r} w\left(t - \frac{r}{V_s}, L\right) \quad (10)$$

where r is the straight line distance from the source to the wavefront, $\rho_f$ is the rock density, Vp is the rock compressional velocity, Vs is the rock shear velocity, $A_1$ is a constant, and the angle ϕ is measured relative to the direction of the point force (i.e., relative to the direction of axial drill tooth impacts at the bottom of the borehole). The rock density $\rho_f$ can be expressed as a function of the rock compressional velocity Vp. More precisely, we have $$\rho_f = 1.74 V_p^{0.25} \quad (11)$$

where Vp is expressed in km·s$^{-1}$ and $\rho_f$ in g·cm$^{-3}$.

Drillbit Axial Force (As a Function of the Top-Drive Force and Velocity)

The Riemann invariants of a hyperbolic PDE are the states corresponding to a transformation of the system which has a diagonalized transport matrix, i.e., the system can be written as a series of transport equations only coupled through the source terms. On the set $\{(t,x)|0<t<T, x\in[0, L]\}$, we define the Riemann invariants as $$u(t, x) = \frac{\partial}{\partial t}\xi(t, x) - c_\xi \frac{\partial}{\partial x}\xi(t, x) \quad (12)$$

$$z(t, x) = \frac{\partial}{\partial t}\xi(t, x) + c_\xi \frac{\partial}{\partial x}\xi(t, x). \quad (13)$$

This transformation enables Eq'n (1) above to be rewritten as the PDE system:

$$\frac{\partial}{\partial t}u(t, x) + c_\xi \frac{\partial}{\partial x}u(t, x) = -\frac{k_\xi}{2}(u(t, x_\xi) + z(t, \xi)) \quad (14)$$

$$\frac{\partial}{\partial t}z(t, x) - c_\xi \frac{\partial}{\partial x}z(t, x) = -\frac{k_\xi}{2}(u(t, x_\xi) + z(t, \xi)). \quad (15)$$

The boundary condition in Eq'n (5) rewrites as:

$$u(t, 0) = z(t, 0) + \frac{2c_\xi}{EA}w_0(t) \quad (16)$$

and the boundary condition in Eq'n (8) can be rewritten as:

$$z(t, L) = -u(t, L) + 2\dot{X}(t) \quad (17)$$

$$\ddot{X}(t) = -\frac{u\zeta\epsilon}{M_b\omega_{bit}}\dot{X}(t) - \frac{w_f}{M_b} - \frac{EA}{2c_\xi M_b}(z(t, L) - u(t, L)). \quad (18)$$

Then, a backstepping transformation can be used to map the systems (14) and (15) into a diagonal target system. This method consists in performing an integral change of variables (usually using a Volterra transformation) that maps the original system to a so-called "target system", for which the analysis is easier. Provided that the transformation is invertible (which is always the case for a Volterra transformation), the original system and the corresponding target system have equivalent properties. First, the coordinates are changed as follows:

$$\hat{u}(t, x) = u(t, x)e^{\frac{k_\xi}{2c_\xi}x}, \hat{z}(t, x) = z(t, x)e^{-\frac{k_\xi}{2c_\xi}x} \quad (19)$$

so that the system (14) and (15) rewrites $$\frac{\partial}{\partial t}\hat{u}(t, x) + c_\xi \frac{\partial}{\partial x}\hat{u}(t, x) = -\frac{k_\xi}{2}e^{\frac{k_\xi}{c_\xi}x}\hat{z}(t, x) \quad (20)$$

$$\frac{\partial}{\partial t}\hat{z}(t, x) - c_\xi \frac{\partial}{\partial x}\hat{z}(t, x) = -\frac{k_\xi}{2}e^{-\frac{k_\xi}{c_\xi}x}\hat{u}(t, x). \quad (21)$$

A modified Volterra transformation is then applied, as follows:

$$\alpha(t,x)=\hat{u}(t,x)+\int_0^x(K^{uu}(x,y)\hat{u}(t,y)+K^{uz}(x,y)\hat{z}(t,y))dy \quad (22)$$

$$\beta(t,x)=\hat{z}(t,x)+\int_0^x(K^{zu}(x,y)\hat{u}(t,y)+K^{zz}(x,y)\hat{z}(t,y))dy \quad (23)$$

where the kernels $K^{uu}$, $K^{zu}$, $K^{uz}$, and $K^{zz}$ are continuous functions defined on the domain $T=\{(x,y)\in[0,L]2, y\leq x\}$. They are defined by the following set of PDEs:

$$\frac{\partial}{\partial x}K^{uu}(x, y) + \frac{\partial}{\partial y}K^{uu}(x, y) = \frac{k_\xi}{2c_\xi}e^{-\frac{k_\xi}{c_\xi}y}K^{uz} \quad (24)$$

$$\frac{\partial}{\partial x}K^{uz}(x, y) - \frac{\partial}{\partial y}K^{uz}(x, y) = \frac{k_\xi}{2c_\xi}e^{\frac{k_\xi}{c_\xi}y}K^{uu} \quad (25)$$

$$\frac{\partial}{\partial x}K^{zu}(x, y) - \frac{\partial}{\partial y}K^{zu}(x, y) = -\frac{k_\xi}{2c_\xi}e^{-\frac{k_\xi}{c_\xi}y}K^{zz} \quad (26)$$

$$\frac{\partial}{\partial x}K^{zz}(x, y) + \frac{\partial}{\partial y}K^{zz}(x, y) = -\frac{k_\xi}{2c_\xi}e^{\frac{k_\xi}{c_\xi}y}K^{zu} \quad (27)$$

with the boundary conditions:

$$K^{uu}(x, 0) = 0, K^{uz}(x, x) = \frac{k_\xi}{4c_\xi}e^{\frac{k_\xi}{c_\xi}x} \quad (28)$$

$$K^{zz}(x, 0) = 0, K^{zu}(x, x) = -\frac{k_\xi}{4c_\xi}e^{-\frac{k_\xi}{c_\xi}x}. \quad (29)$$

The system of Eq'ns (24)-(29) admits a unique continuous solution on T. For all $(x, y)\in T$, $$K^{uu}(x, y) = \frac{k_\xi}{2c_\xi}e^{\frac{k_\xi(x-y)}{2c_\xi}}\frac{yI_1\left(\sqrt{x^2-y^2}\frac{k_\xi}{2c_\xi}\right)}{\sqrt{x^2-y^2}} \quad (30)$$

where $I_1$ is the modified Bessel function of the first kind. The kernel $K^{uv}$ can be obtained using (25). Finally, the remaining kernels can be found by changing $k_\xi$ in $-k_\xi$. Then, differentiating (22) and (23) with respect to time and space and integrating by parts, one can show that the states $\alpha$ and $\beta$ satisfy the following set of transport PDEs:

$$\frac{\partial}{\partial t}\alpha(t, x) + c_\xi \frac{\partial}{\partial x}\alpha(t, x) = -c_\xi K^{uz}(x, 0)\beta(t, 0) \quad (31)$$

$$\frac{\partial}{\partial t}\beta(t, x) - c_\xi \frac{\partial}{\partial x}\beta(t, x) = c_\xi K^{zu}(x, 0)\alpha(t, 0) \quad (32)$$

with the topside boundary condition $$\alpha(t, 0) = \beta(t, 0) + \frac{2c_\xi}{EA}w_0(t). \quad (33)$$

As the transformation of (22) and (23) is a Volterra transformation, it is invertible. The inverse transformation is defined by $$\hat{u}(t,x) = \alpha(t,x) + \int_0^x (L^{\alpha\alpha}(x,y)\alpha(t,y) + L^{\alpha\beta}(x,y)\beta(t,y))dy \quad (34)$$

$$\hat{z}(t,x) = \beta(t,x) + \int_0^x (L^{\beta\alpha}(x,y)\alpha(t,y) + L^{\beta\beta}(x,y)\beta(t,y))dy \quad (35)$$

where the kernels $L^{\alpha\alpha}$, $L^{\beta\alpha}$, $L^{\alpha\beta}$, and $L^{\beta\beta}$ are continuous functions defined on the domain $T = \{(x,y) \in [0,1]^2, y \leq x\}$. They satisfy the following Volterra equation, defined for $0 \leq y \leq x \leq 1$, $$L(x,y) = -K(x,y) - \int_y^x K(x,v)L(v,y)dv \quad (36)$$

where the functions $K(\cdot,\cdot)$ and $L(\cdot,\cdot)$ are defined as $$K(x,y) = \begin{pmatrix} K^{uu}(x,y) & K^{uv}(x,y) \\ K^{vu}(x,y) & K^{vv}(x,y) \end{pmatrix}$$

$$L(x,y) = \begin{pmatrix} K^{\alpha\alpha}(x,y) & K^{\alpha\beta}(x,y) \\ K^{\beta\alpha}(x,y) & K^{\beta\beta}(x,y) \end{pmatrix}.$$

These inverse kernels are required to express the force exerted on the bit as a function of the top-drive force and velocity.

Using the inverse transformation of (34) and (35), it becomes possible to express for all $x \in [0,L]$ the functions $u(t,x)$ and $z(t,x)$ as functions of $\alpha(\cdot,0)$ and $\beta(\cdot,0)$, respectively. Applying the method of characteristics on (31)-(32), for any $x \in [0,L]$ and for any $t \geq (x/c_\xi)$, we get $$\alpha(t,x) = \alpha\left(t - \frac{x}{c_\xi}, 0\right) - c_\xi \int_0^{\frac{x}{c_\xi}} K^{uz}(x - c_\xi s, 0)\beta(t-s,)ds \quad (37)$$

$$\beta(t,x) = \beta\left(t + \frac{x}{c_\xi}, 0\right) - c_\xi \int_0^{\frac{x}{c_\xi}} K^{zu}(x - c_\xi s, 0)\alpha(t+s,)ds. \quad (38)$$

Combining these equations with (34) gives $$\hat{u}(t,L) = \alpha\left(t - \frac{L}{c_\xi}, 0\right) - c_\xi \int_0^{\frac{L}{c_\xi}} K^{uz}(L - c_\xi s, 0)\beta(t-s,0)ds +$$

$$\int_0^L L^{\alpha\alpha}(L,y)\alpha\left(t - \frac{y}{c_\xi}, 0\right) + L^{\alpha\beta}(L,y)\beta\left(t + \frac{y}{c_\xi}, 0\right)dy -$$

$$c_\xi \int_0^L \int_0^{\frac{y}{c_\xi}} L^{\alpha\alpha}(L,Y)K^{uz}(y - c_\xi s, 0)\beta(t-s,0)dsdy -$$

$$c_\xi \int_0^L \int_0^{\frac{y}{c_\xi}} L^{\alpha\beta}(L,y)K^{zu}(y - c_\xi s, 0)\alpha(t+s,0)dsdy.$$

This implies, using Fubini's theorem and a simple change of variable, $$\hat{u}(t,L) = \alpha\left(t - \frac{L}{c_\xi}, 0\right) - c_\xi \int_0^{\frac{L}{c_\xi}} K^{uz}(L - c_\xi s, 0)\beta(t-s,0)ds +$$

$$c_\xi \int_0^{\frac{L}{c_\xi}} L^{\alpha\alpha}(L, c_\xi y)\alpha(t-y,0) + L^{\alpha\beta}(l, c_\xi y) \times \beta(t+y,0)dy -$$

$$c_\xi \int_0^{\frac{L}{c_\xi}} \int_{c_\xi s}^L (L^{\alpha\alpha}(L,y)K^{uz} \times (y - c_\xi s, 0)dy)\beta(t-s,0)ds -$$

$$c_\xi \int_0^{\frac{L}{c_\xi}} \int_{c_\xi s}^L (L^{\alpha\beta}(L,Y) \times K^{zu}(y - c_\xi s, 0)dy)\alpha(t+s,0)ds.$$

Finally, using a new change of variable, $$\hat{u}(t,L) = \alpha\left(t - \frac{L}{c_\xi}, 0\right) + \quad (39)$$

$$\int_{-\frac{L}{c_\xi}}^{\frac{L}{c_\xi}} c_\xi f_1^u(s)\alpha(t-s,0)ds + \int_{-\frac{L}{c_\xi}}^{\frac{L}{c_\xi}} c_\xi f_2^u(s)\beta(t-s,0)ds$$

where $f_1^u$ and $f_2^u$ are $L^\infty$ functions defined on the interval $[-(L/c_\xi), (L/c_\xi)]$ by $$f_1^u(s) = \mathbb{1}_{\left[0, \frac{L}{c_\xi}\right]}(s)(L^{\alpha\beta}(L,y)K^{zu}(y + c_\xi s, 0)dy) \times \quad (40)$$

$$\left(\int_{-c_\xi s}^L L^{\alpha\beta}(L,y)K^{zu}(y + c_\xi s, 0)dy\right)$$

$$f_2^u(s) = \mathbb{1}_{\left[-\frac{L}{c_\xi}, 0\right]}(s)(L^{\alpha\beta}(L, -c_\xi s)) - \quad (41)$$

$$\mathbb{1}_{\left[0, \frac{L}{c_\xi}\right]}(s)\left(K^{uz}(L - \times c_\xi s, 0) + \int_{c_\xi s}^L L^{\alpha\alpha}(L,y)K^{uz}(y - c_\xi s, 0)dy\right).$$

Similar computations can be done on the state $\hat{z}$ to obtain, for all $t \geq (L/c_\xi)$, $$\hat{z}(t,L) = \beta\left(t + \frac{L}{c_\xi}, 0\right) + \quad (42)$$

$$\int_{-\frac{L}{c_\xi}}^{\frac{L}{c_\xi}} c_\xi f_1^z(s)\alpha(t-s,0)ds + \int_{-\frac{L}{c_\xi}}^{\frac{L}{c_\xi}} c_\xi f_2^z(s)\beta(t-s,0)ds$$

where $f_1^z$ and $f_2^z$ are $L^\infty$ functions defined on the interval $[-(L/c_\xi), (L/c_\xi)]$ by $$f_1^z(s) = \mathbb{1}_{\left[0, \frac{L}{c_\xi}\right]}(s)(L^{\beta\alpha}(L, c_\xi s)) - \mathbb{1}_{\left[-\frac{L}{c_\xi}, 0\right]}(s) \times \quad (43)$$

$$\left(\int_{-c_\xi s}^L L^\beta(L,y) \cdot K^{zu}(y + c_\xi s, 0)dy + K^{zu} \times (L + c_\xi s, 0)\right)$$

$$f_2^z(s) = \mathbb{1}_{\left[-\frac{L}{c_\xi}, 0\right]}(s)(L^{\beta\beta}(L, -c_\xi s)) - \quad (44)$$

$$\mathbb{1}_{\left[0, \frac{\cdot}{c_\xi}\right]}(s) \cdot \left(\int_{c_\xi s}^L L^{\beta\alpha}(L,Y)K^{uz}(y - c_\xi s, 0)dy\right).$$

The axial force at the drillbit can then be expressed as a function of the topside velocity and hook load, knowing that the weight is as follows:

$$w(t,L) = -EA\frac{\partial \xi(t,L)}{\partial x} = EA\frac{u(t,L) - z(t,L)}{2c_\xi} \quad (45)$$

$$= EA\frac{e^{-\frac{k_\xi L}{2c_\xi}}\hat{u}(t,L) - e^{\frac{k_\xi L}{2c_\xi}}\hat{z}(t,L)}{2c_\xi}.$$

Using (39) and (42), Eq'n (45) may be written as:

$$w(t, L) = EA \frac{e^{-\frac{k_\xi L}{2c_\xi}} u\left(t - \frac{L}{c_\xi}, 0\right) - e^{\frac{k_\xi L}{2c_\xi}} z\left(t + \frac{L}{c_\xi}, 0\right)}{2c_\xi} + \int_{-\frac{L}{c_\xi}}^{\frac{L}{c_\xi}} (f_u(s)u(t-s, 0) + f_z(s)z(t-s, 0))dy \quad (46)$$

where the functions $f_u$ and $f_z$ are, respectively, defined by $$f_u(s) = \frac{EA}{2}\left(e^{-\frac{k_\xi L}{2c_\xi}} f_1^u(s) - e^{\frac{k_\xi L}{2c_\xi}} f_1^z(s)\right) \quad (47)$$

$$f_z(s) = \frac{EA}{2}\left(e^{-\frac{k_\xi L}{2c_\xi}} f_2^u(s) - e^{\frac{k_\xi L}{2c_\xi}} f_2^z(s)\right). \quad (48)$$

Then, using the expressions of the Riemann invariants given in (12) and (13) and the definition of the axial force and velocity, we immediately obtain $$w(t, L) = \frac{EA}{2c_\xi}\left(e^{-\frac{k_\xi L}{2c_\xi}} v\left(t - \frac{L}{c_\xi}, 0\right) - e^{\frac{k_\xi L}{2c_\xi}} v\left(t + \frac{L_l}{c_\xi}, 0\right)\right) + \frac{1}{2}\left(e^{-\frac{k_\xi L}{2c_\xi}} w\left(t - \frac{L}{c_\xi}, 0\right) + e^{\frac{k_\xi L}{2c_\xi}} w\left(t + \frac{L_l}{c_\xi}, 0\right)\right) + \int_{-\frac{L}{c_\xi}}^{\frac{L}{c_\xi}} (f_u(s) + f_z(s))v(t-s, 0)ds + \int_{-\frac{L}{c_\xi}}^{\frac{L}{c_\xi}} \frac{c_\xi}{EA}(f_u(s) - f_z(s))w(t-s, 0)ds. \quad (49)$$

Figure 8:
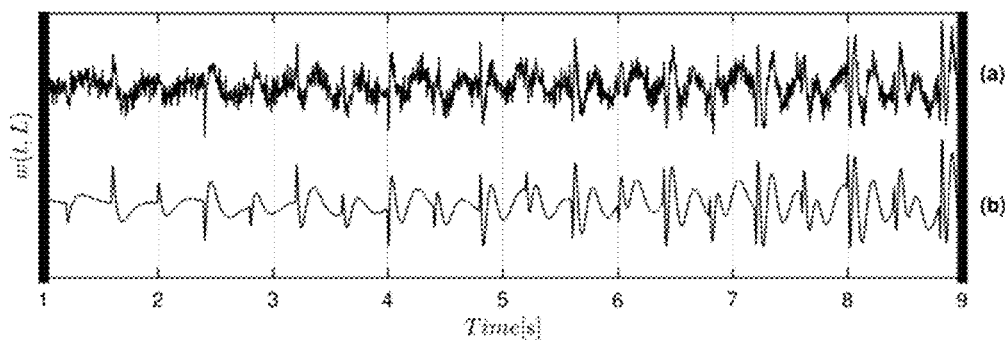
FIG. 8 shows simulated and estimated drillbit source signatures according to equations disclosed herein (i.e., top-drive measurements and drill string modeling method)

Note that this expression for the drillbit source signature does not directly depend on the downhole boundary condition, but rather on known and easily measurable values. FIG. 8 shows drillbit signatures as simulated (series (a)) and as estimated (series (b)), according to the above equations. As can be seen, the estimated values correspond well with the simulated values. More information can be found in [10].

Full Waveform Inversion of SWD Data

The seismic-while-drilling forward modeling problem can be written as $$M(x)\frac{\partial^2 u(x, t)}{\partial t^2} + S(x)\frac{\partial u(t, x)}{\partial t} + Du(x, y) = F(x, t) \quad (50)$$

where M is the mass matrix, S is the stiffness matrix, D is the damping matrix, F is the drillbit source signature, x is the spatial coordinates, t is time, and u is the seismic wavefield. Equation (50) in the frequency domain is $$[-\omega^2 M(x) + j\omega S(x) + D(x)]u(x, \omega) = F(x, \omega) \quad (51)$$

where ω is angular frequency, and $j=\sqrt{-1}$ is complex identity. Hence, the wave equation in the frequency domain, i.e., Equation (51), can be expressed as a linear system of equations $$B(x, \omega)u(x, \omega) = F(x, \omega) \quad (52)$$

where $B(x,\omega) = -\omega^2 M(x) + j\omega S(x) + D(x)$ is the impedance matrix. The properties of the subsurface such as velocity and density are embedded in the impedance matrix. Hence, the relationship between the physical properties of the subsurface and the seismic wavefield is nonlinear. The forward modeling reads $$u = L(m) \quad (53)$$

where m is the vector of subsurface properties, L is the forward modeling operator, and u is the vector of forward modeled data. Full waveform inversion is a local optimization problem which aims to estimate the subsurface properties by matching the recorded wavefield at the surface $n_{obs}$ to the modeled data $u_{cal} = L(m)$. The simplest similarity measurement cost function can be written as:

$$J = \|u_{obs} - L(m)\|_2^2 + \alpha\|m\|_2^2 \quad (54)$$

where α is a regularization parameter. Minimizing the cost function J with respect to the subsurface model parameters m is a non-linear optimization problem. In real world applications, iterative algorithms are typically used to solve this non-linear optimization problem. Here, the well-known L-BFGS (i.e., "limited-memory Broyden-Fletcher-Goldfarb-Shanno") method is used to iteratively find the desired solution m.

Now referring back to FIG. 2, once the server 40 has received surface seismic data from the at least one surface sensor, full waveform inversion on the surface data is performed (as is known). Then, the inverted velocity from the full waveform inversion of surface data is used as an initial solution when performing the FWI of the SWD data, according to the equations above and using the drillbit source signature. Exemplary results of such a process are shown in FIG. 9.

Figure 9:
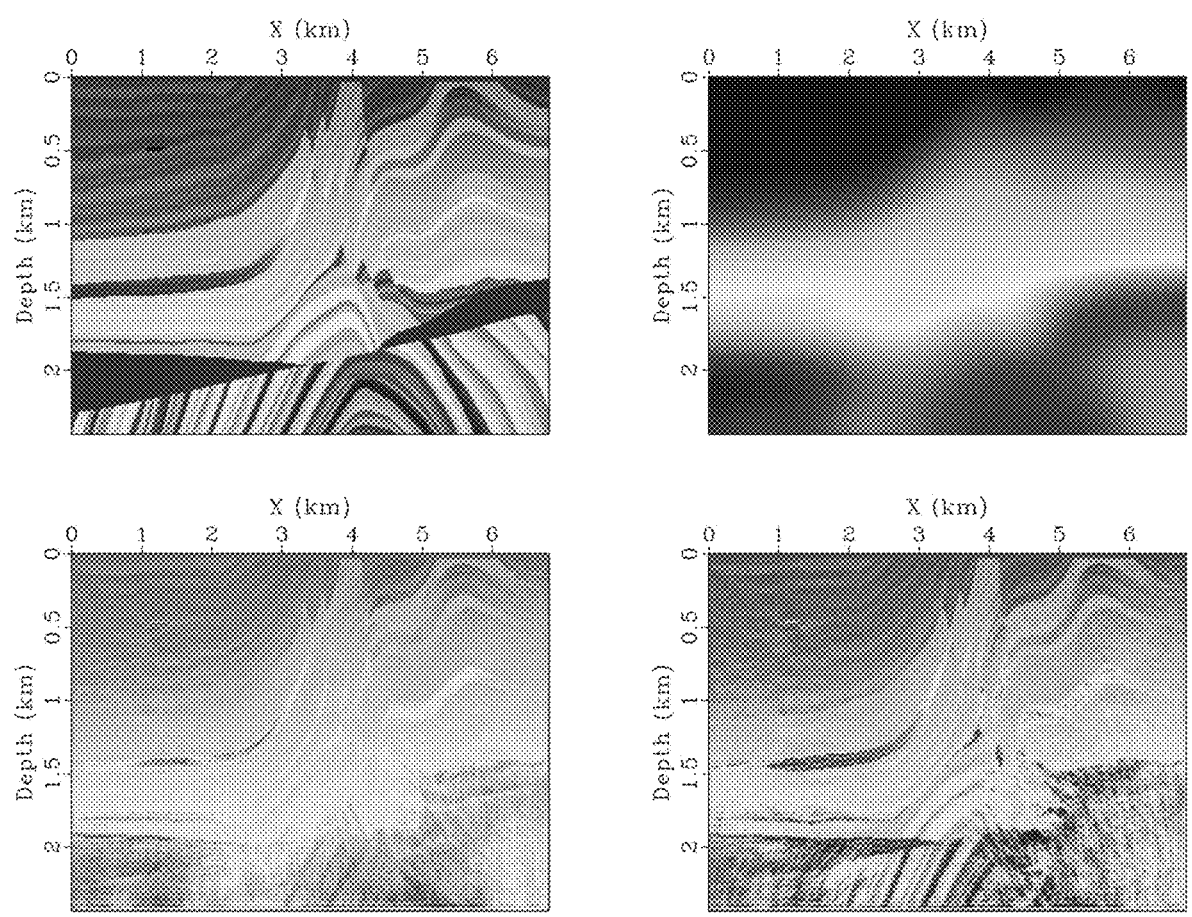
FIG. 9 shows the output of the successive surface-FWI and SWD-FWI method of one aspect of the invention, using a standard model as the base where the top-left image is the ground truth subsurface velocity model, the top-right image is the background subsurface velocity model estimated by kinematic analysis of the surface seismic data, the bottom-left image is the subsurface model by using surface-FWI with background velocity as an initial solution, and the bottom-right is a subsurface model obtained by using SWD-FWI with surface-FWI velocity as an initial solution.

Example 1 (FIG. 9)

A modified Marmousi2 model was used as the basis for this example (shown in FIG. 9, upper-left). The model is ≈2.5 km in the depth direction and ≈7 km in the horizontal direction. The depth sampling and horizontal sampling are 10 meters. 66 surface seismic sources were deployed near the surface, with a shot spacing of 100 meters. Acoustic finite difference modeling was used to generate synthetic seismic recordings. The generated shot gathers did not have free surface multiples. The receivers were active for all shots and were densely deployed near the surface with a receiver interval of 10 m. A Ricker wavelet with the dominant frequency of 30 Hz is used as a source signature. To better show the effects of the present invention, the data was assumed to lack low-frequency components, as is usually the case in real-world applications. Hence, 46 frequency realizations in the model were inverted from 5 to 50 Hz with 500 iterations. FIG. 9, upper-right, shows the initial velocity estimated by kinematic analysis of the seismic recordings.

FIG. 9, lower-left, shows a subsurface model resulting from performing FWI on surface seismic data only. FIG. 9, lower-right, shows a subsurface model resulting from performing FWI on surface seismic data and then using the resulting approximation as an initial solution for SWD-FWI, as in the present invention. Clearly, the lower-right image is closest to the true model (in the upper left). It should be clear that successive surface-FWI and SWD-FWI provide an advantage in terms of model accuracy.

Figure 10:
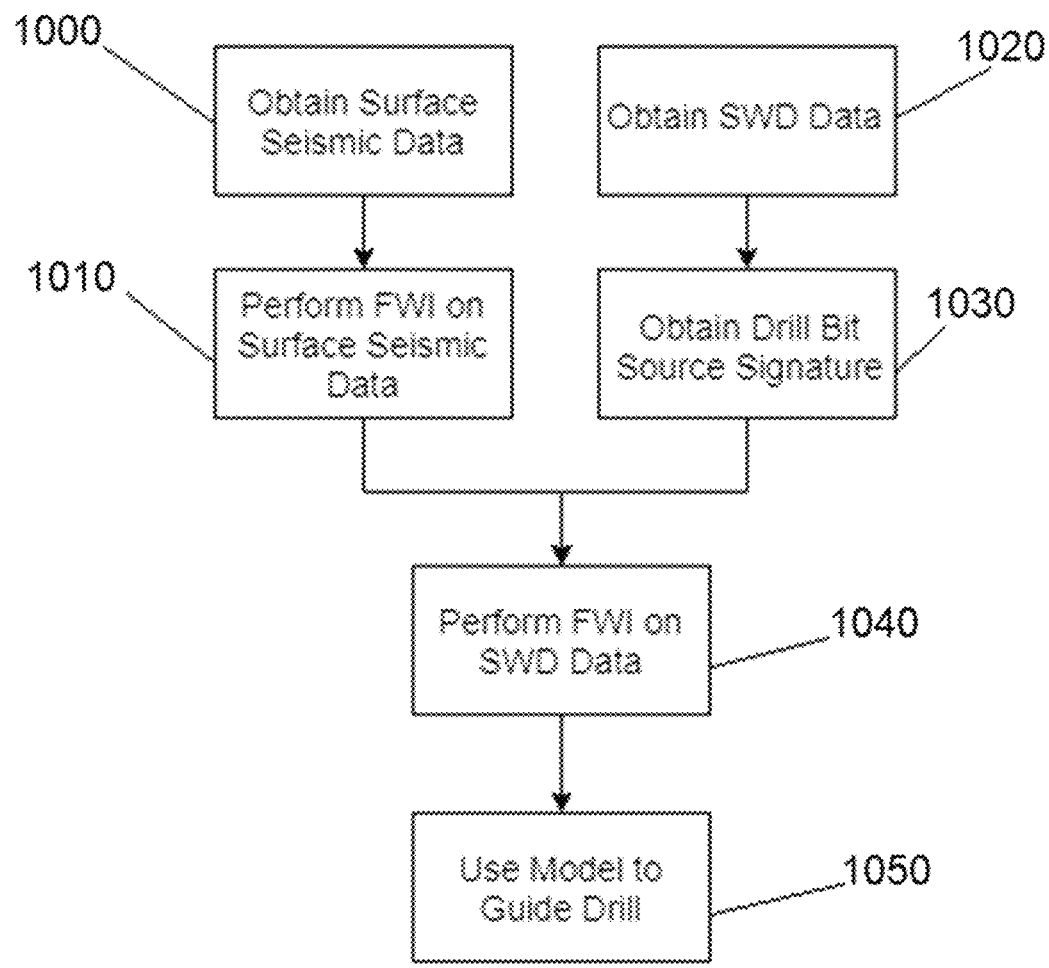
FIG. 10 is a flowchart detailing a method according to an aspect of the invention.

FIG. 10 now provides a flowchart depicting a method according to one aspect of the invention. At step 1000, surface seismic data is obtained. FWI is performed on the surface data at step 1010 to obtain a first approximation of the subsurface. At step 1020, the SWD data is obtained. At step 1030, the drillbit source signature is determined. As noted above, the drillbit source signature can be determined from the SWD data or it can be found using drill string modeling and top-drive measurements. Further, in some embodiments, machine learning methods may be used to determine the drillbit source signature. At step 1040, FWI is performed on the SWD data, using the drillbit source signature and using the first approximation from the surface-FWI as an initial solution. The resulting subsurface model can then be used to guide the drill at step 1050.

Figure 11A:
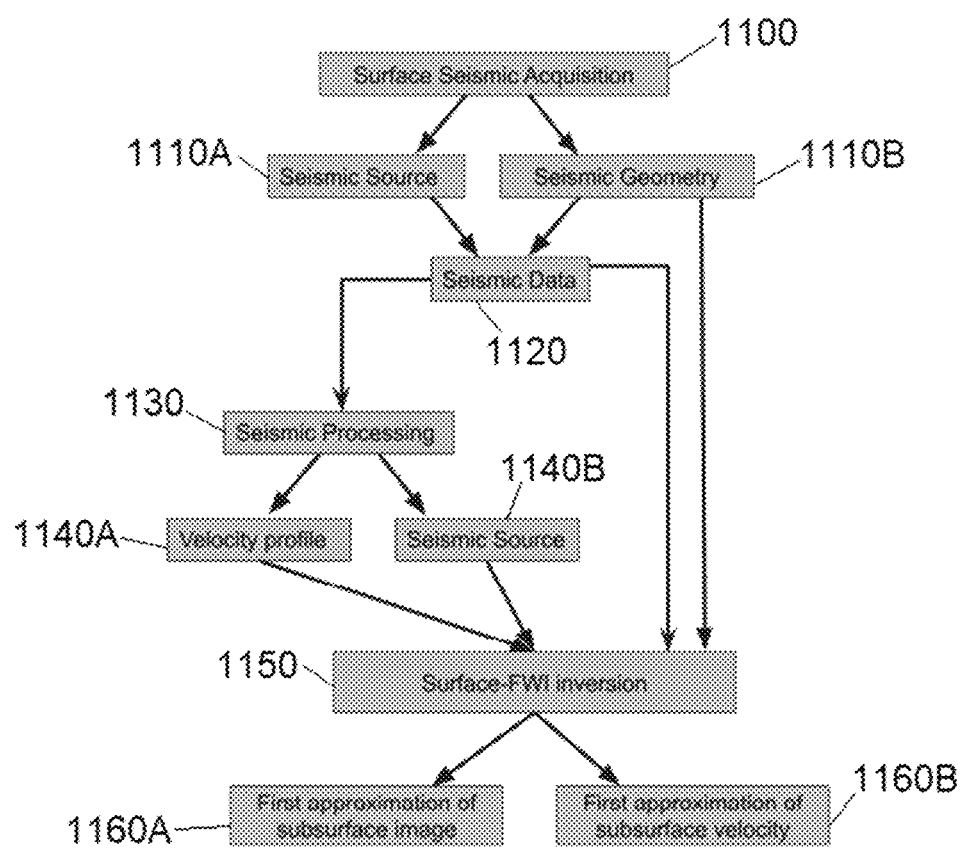
FIGS. 11A and 11B show flowcharts summarizing the steps in methods according to the present invention.
Figure 11B:
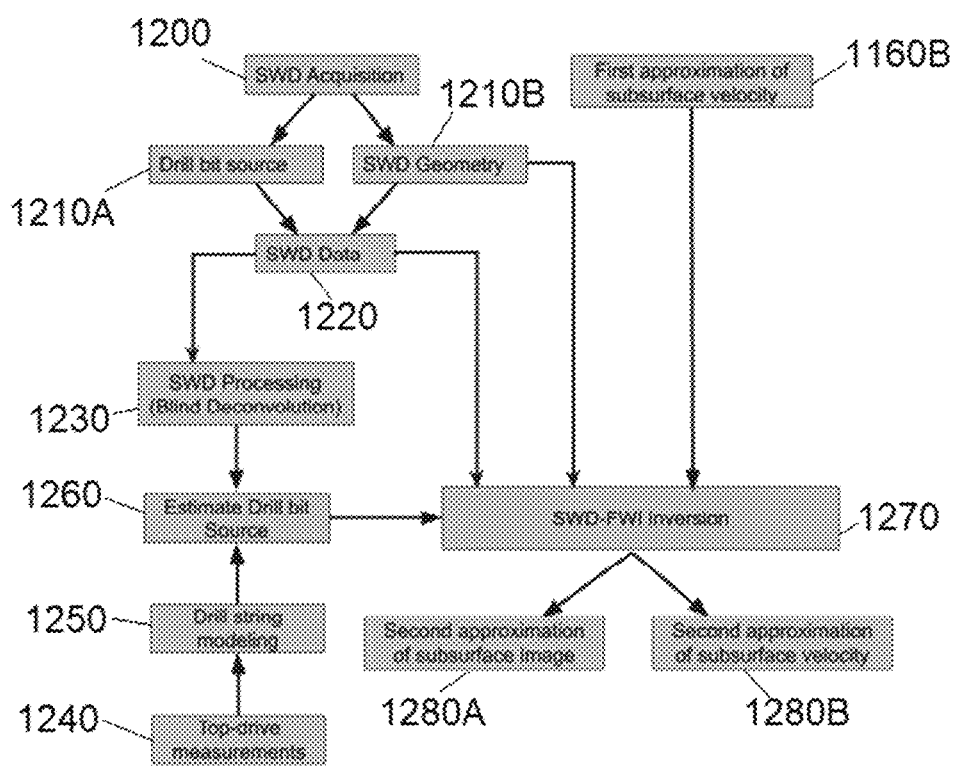

FIGS. 11A and 11B summarize the steps in two methods according to variants of the present invention. These flowcharts summarize the various steps that have been described in detail above.

As noted above, for a better understanding of the present invention, the following references may be consulted. Each of these references is hereby incorporated by reference in its entirety:

[1] J. Virieux and S. Operto, "An overview of full-waveform inversion in exploration geophysics", Geophysics, vol. 74, pp. WCC1-WCC26, 2009;

[2] R. J. Meehan, L. Nutt, N. Dutta, and J. Menzies, "Drill Bit Seismic: A Drilling Optimization Tool", paper presented at the IADC/SPE Drilling Conference, Dallas Texas, USA, 3-6 Mar., 1998, DOI: http://doi.org/10.2118/39312-MS;

[3] N. Kazemi and M. D. Sacchi, "Sparse Multichannel Blind Deconvolution", Geophysics, vol 79, no. 5, pp. V143-V152, 2014, DOI: https://doi.org/10.1190/geo2013-0465.1;

[4] J. Auriol, N. Kazemi, and S. Niculescu, "Sensing and computational frameworks for improving drill-string dynamics estimation", Mechanical Systems and Signal Processing, vol. 160, DOI: https://doi.org/10.1016/j.ymssp.2021.107836;

[5] F. Di Meglio and U. J. F. Aarsnes, "A distributed parameter systems view of control problems in drilling," IFAC-PapersOnLine, vol. 48, no. 6, pp. 272-278, 2015;

[6] C. Germay, N. Van de Wouw, H. Nijmeijer, and R. Sepulchre, "Nonlinear drillstring dynamics analysis," SIAM J. Appl. Dyn. Syst., vol. 8, no. 2, pp. 527-553, 2009, DOI: https://doi.org/10.1137/060675848;

[7] E. Cayeux, "On the importance of boundary conditions for realtime transient drill-string mechanical estimations," in Proc. IADC/SPE Drilling Conf. Exhibit., March 2018, pp. 1-31, DOI: https://doi.org/10.2118/189642-MS;

[8] T. Richard, C. Germay, and E. Detournay, "A simplified model to explore the root cause of stick-slip vibrations in drilling systems with drag bits," J. Sound Vib., vol. 305, no. 3, pp. 432-456, August 2007. [Online]. Available: http://linkinghub.elsevier.com/retrieve/pii/S0022460X07002908;

[9] D. Gray, S. Day, and S. Schapper, "Rock Physics Driven Seismic Data Processing for the Athabasca Oil Sands, Northeastern Alberta", CSEG Recorder, vol. 40, no. 3, pp. 32-40;

[10] J. Auriol., N. Kazemi, R. J. Shor, K. A. Innanen, and I. D. Gates "A Sensing and Computational Framework for Estimating the Seismic Velocities of Rocks Interacting with the Drillbit", IEEE Transactions on Geoscience and Remote Sensing, vol. 58, no. 5, pp. 3178-3189, 2019, DOI: http://dx.doi.org/10.1109/TGRS.2019.2950257;

[11] N. Kazemi, S. Nejadi, J. Auriol, J. Curkan, R. J. Shor, K. A. Innanen, S. M. Hubbard, and I. D. Gates, "Advanced sensing and imaging for efficient energy exploration in complex reservoirs", Energy Reports, 2020, DOI: http://doi.org/10.1016/j.egyr.2020.11.036; and

[12] S. Nejadi, N. Kazemi, J. A. Curkan, J. Auriol, P. R. Durkin, S. M. Hubbard, K. A. Innanen, R. J. Shor, and I. D. Gates, "Look Ahead of the Bit While Drilling: Potential Impacts and Challenges of Acoustic Seismic While Drilling in the McMurray Formation", SPE Journal, vol. 25, no. 5, 2020, DOI: https://doi.org/10.2118/199931-PA.

It should be clear that various aspects of the present invention may be implemented as software modules in an overall software system. As such, the present invention may thus take the form of computer executable instructions that, when executed, implements various software modules with predefined functions. Additionally, it should be clear that, unless otherwise specified, any references herein to 'image' or to 'images' refer to a digital image or to digital images, comprising pixels or picture cells.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for guiding a drilling rig using a subsurface model, said drilling rig comprising at least a drill and a drill control unit, the system comprising:
   at least one surface sensor positioned on a ground surface at a distance from said drilling rig, wherein said at least one surface sensor is configured to detect surface seismic data;
   at least one subsurface sensor coupled to said drill, wherein said at least one subsurface sensor is configured to detect subsurface seismic-while-drilling (SWD) data when said drill is in operation; and
   a server operatively connected to said at least one surface sensor and to said drill control unit,
   and wherein server is configured to process said surface seismic data using a first full waveform inversion (FWI) to thereby produce a first approximation of a subsurface surrounding said drill,
   and wherein said server is further configured to process said first approximation, said SWD data, and a drillbit source signature related to said drill using a second FWI, to thereby produce said subsurface model,
   and wherein said subsurface model is used to guide said drilling rig.

2. The system according to claim 1, wherein instructions are provided to said drill control unit based on said subsurface model.

3. The system according to claim 1, wherein said drill comprises a drill string and a drillbit and wherein said drillbit source signature is based on characteristics of at least one of said drill string and said drillbit.

4. The system according to claim 1, wherein said server removes noise from said surface seismic data and said SWD data before performing FWI.

5. The system according to claim 1, wherein said surface seismic data and said SWD data are gathered in the form of at least one of seismic pressure information and seismic particle velocity information.

6. The system according to claim 1, wherein said subsurface has a non-uniform composition.

7. The system according to claim 1, wherein said drill is used for at least one of: exploratory purposes; extraction purposes; scientific purposes; and commercial purposes.

8. The system according to claim 1, wherein at least one other subsurface sensor in a nearby well is configured to detect subsurface crosswell seismic-while-drilling (SWD) data when said drill is in operation, and said crosswell SWD data is processed with said SWD data by said server.

9. A method for guiding a drilling rig using a subsurface model, wherein said drilling rig comprises at least a drill, a drill support structure, and a drill control unit, and wherein said drill is positioned below a ground surface when said drill is in operation, the method comprising the steps of:
   obtaining surface seismic data using at least one surface sensor positioned on said ground surface at a distance from said drilling rig;
   processing said surface seismic data using a first full waveform inversion (FWI) to thereby produce a first approximation of a subsurface surrounding said drill;
   obtaining seismic-while-drilling (SWD) data from at least one subsurface sensor coupled to said drill;
   determining a drillbit signature;
   processing said first approximation, said drillbit source signature, and said SWD data using a second FWI to thereby produce said subsurface model; and
   using said subsurface model to guide said drilling rig.

10. The method according to claim 9, wherein instructions are provided to said drill control unit based on said subsurface model.

11. The method according to claim 9, wherein said drill comprises a drill string and a drillbit and wherein said drillbit source signature is based on characteristics of at least one of said drill string and said drillbit.

12. The method according to claim 9, further comprising a step of removing noise from said surface seismic data before performing said first FWI.

13. The method according to claim 9, further comprising a step of removing noise from said SWD data before performing said second FWI.

14. The method according to claim 9, wherein said surface seismic data and said SWD data are gathered in the form of at least one of seismic pressure information and seismic particle velocity information.

15. The method according to claim 9, wherein said subsurface has a non-uniform composition.

16. The method according to claim 9, wherein said drill is used for at least one of: exploratory purposes; extraction purposes; scientific purposes; and commercial purposes.

17. The method according to claim 9, wherein said drillbit source signature is determined using said SWD data.

18. The method according to claim 9, wherein said drillbit source signature is determined using drill string modeling and top-drive measurements.

19. The method according to claim 9, wherein at least one other subsurface sensor in a nearby well is configured to detect subsurface crosswell seismic-while-drilling (SWD) data when said drill is in operation, and wherein said crosswell SWD data is processed with said SWD data.

20. Non-transitory computer-readable media having encoded thereon computer-readable and computer-executable instructions that, when executed, implement a method for guiding a drilling rig using a subsurface model, wherein said drilling rig comprises at least a drill, a drill support structure, and a drill control unit, and wherein said drill is positioned below a ground surface when said drill is in operation, the method comprising the steps of:
   obtaining surface seismic data using at least one surface sensor positioned on said ground surface at a distance from said drilling rig;
   processing said surface seismic data using a first full waveform inversion (FWI) to thereby produce a first approximation of a subsurface surrounding said drill;
   obtaining seismic-while-drilling (SWD) data from at least one subsurface sensor coupled to said drill;
   determining a drillbit signature;
   processing said first approximation, said drillbit source signature, and said SWD data using a second FWI to thereby produce said subsurface model; and
   using said subsurface model to guide said drilling rig.

* * * * *